United States Patent
Birnkrant

(10) Patent No.: US 11,340,172 B2
(45) Date of Patent: May 24, 2022

(54) ENHANCED ROBUSTNESS FOR HIGH SENSITIVITY FIBER OPTIC SMOKE DETECTION

(71) Applicant: Carrier Corporation, Palm Beach Gardens, FL (US)

(72) Inventor: Michael J. Birnkrant, Wethersfield, CT (US)

(73) Assignee: CARRIER CORPORATION, Palm Beach Gardens, FL (US)

(*) Notice: Subject to any disclaimer, the term of this patent is extended or adjusted under 35 U.S.C. 154(b) by 0 days.

(21) Appl. No.: 17/057,005

(22) PCT Filed: Jul. 11, 2019

(86) PCT No.: PCT/US2019/041374
§ 371 (c)(1),
(2) Date: Nov. 19, 2020

(87) PCT Pub. No.: WO2020/014461
PCT Pub. Date: Jan. 16, 2020

(65) Prior Publication Data
US 2021/0208078 A1    Jul. 8, 2021

Related U.S. Application Data

(60) Provisional application No. 62/697,550, filed on Jul. 13, 2018.

(51) Int. Cl.
*G01J 3/44* (2006.01)
*G01N 21/65* (2006.01)
*G08B 17/107* (2006.01)

(52) U.S. Cl.
CPC .......... *G01N 21/65* (2013.01); *G08B 17/107* (2013.01); *G01N 2201/0633* (2013.01); *G01N 2201/08* (2013.01)

(58) Field of Classification Search
CPC ...... G01J 3/02; G01J 3/28; G01J 3/44; G01N 21/65
See application file for complete search history.

(56) References Cited

U.S. PATENT DOCUMENTS

| | | | |
|---|---|---|---|
| 4,824,251 A * | 4/1989 | Slotwinski | G01B 9/02004 356/4.09 |
| 5,280,272 A | 1/1994 | Nagashima et al. | |

(Continued)

FOREIGN PATENT DOCUMENTS

| DE | 102013213721 A1 | 5/2014 |
|---|---|---|
| JP | 5586318 B2 | 9/2014 |

(Continued)

OTHER PUBLICATIONS

International Search Report of the International Searching Authority; International Application No. PCT/US2019/041374; International Filing Date: Jul. 11, 2019; dated Jan. 15, 2020; 5 pages.

(Continued)

*Primary Examiner* — Abdullahi Nur
(74) *Attorney, Agent, or Firm* — Cantor Colburn LLP

(57) ABSTRACT

A detection system for measuring one or more conditions within a predetermined area includes a fiber optic cable including a first core for transmitting light to the ambient atmosphere adjacent a node and a second core for receiving scattered light from the ambient atmosphere adjacent the node. A discrimination assembly operably coupled to the first and second cores includes at least one focusing element and at least one optical enhancement device. The at least one optical enhancement device separates the scattered light received from the ambient atmosphere into a plurality of wavelengths. A control system operably coupled to the fiber optic cable receives the scattered light received from the ambient atmosphere. The scattered light received from the ambient atmosphere has a higher frequency than the light (Continued)

transmitted to the ambient atmosphere and only the scattered light having a desired wavelength is transmitted to the control system.

21 Claims, 22 Drawing Sheets

(56) References Cited

U.S. PATENT DOCUMENTS

| | | |
|---|---|---|
| 5,381,130 A | 1/1995 | Thuillard et al. |
| 5,557,262 A | 9/1996 | Tice |
| 5,576,697 A | 11/1996 | Nagashima et al. |
| 6,150,935 A | 11/2000 | Anderson |
| 6,515,589 B2 | 2/2003 | Schneider et al. |
| 6,967,582 B2 | 11/2005 | Tice et al. |
| 8,078,410 B2 | 12/2011 | Marquardt et al. |
| 8,638,436 B2 | 1/2014 | Dohi |
| 8,797,531 B2 | 8/2014 | Knox et al. |
| 9,244,010 B2 | 1/2016 | Wagner et al. |
| 9,691,246 B2 | 6/2017 | Ebner et al. |
| 2008/0204718 A1 | 8/2008 | Trainer |
| 2018/0284226 A1* | 10/2018 | LaChapelle ............ G01W 1/14 |

FOREIGN PATENT DOCUMENTS

| | | |
|---|---|---|
| WO | 9826387 A2 | 6/1998 |
| WO | 2018089474 A1 | 5/2018 |
| WO | 2018089478 A1 | 5/2018 |

OTHER PUBLICATIONS

Written Opinion of the International Searching Authority; International Application No. PCT/US2019/041374 International Filing Date: Jul. 11, 2019; dated Jan. 15, 2020; 14 pages.

* cited by examiner

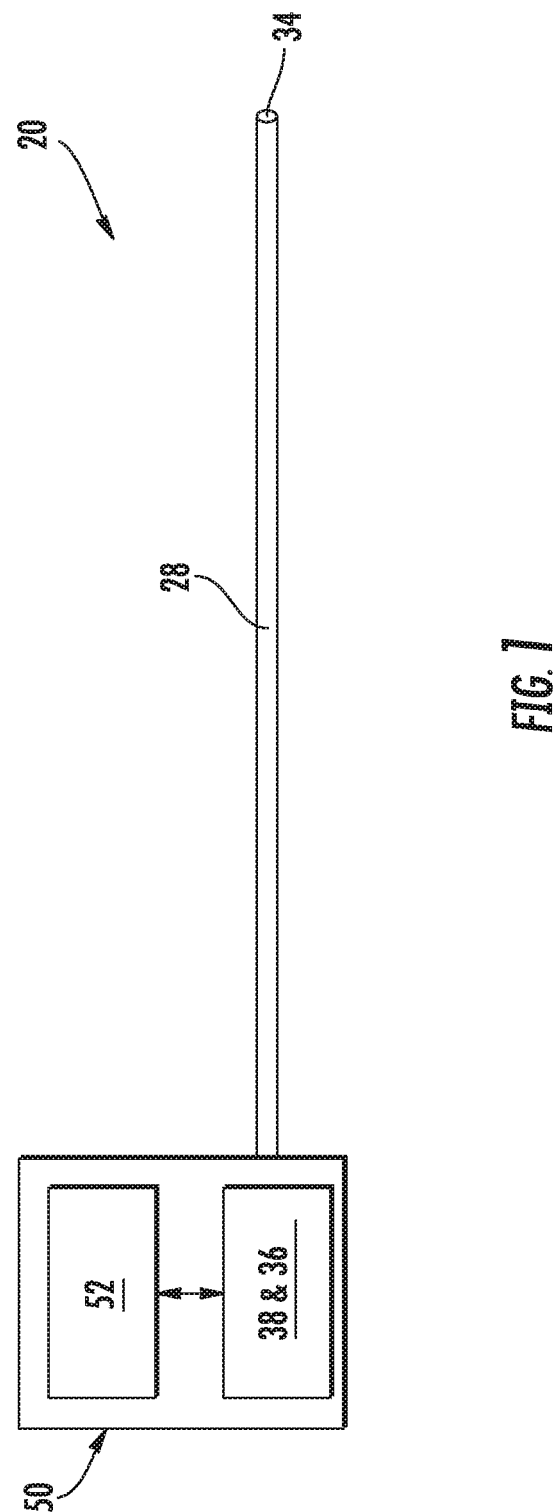

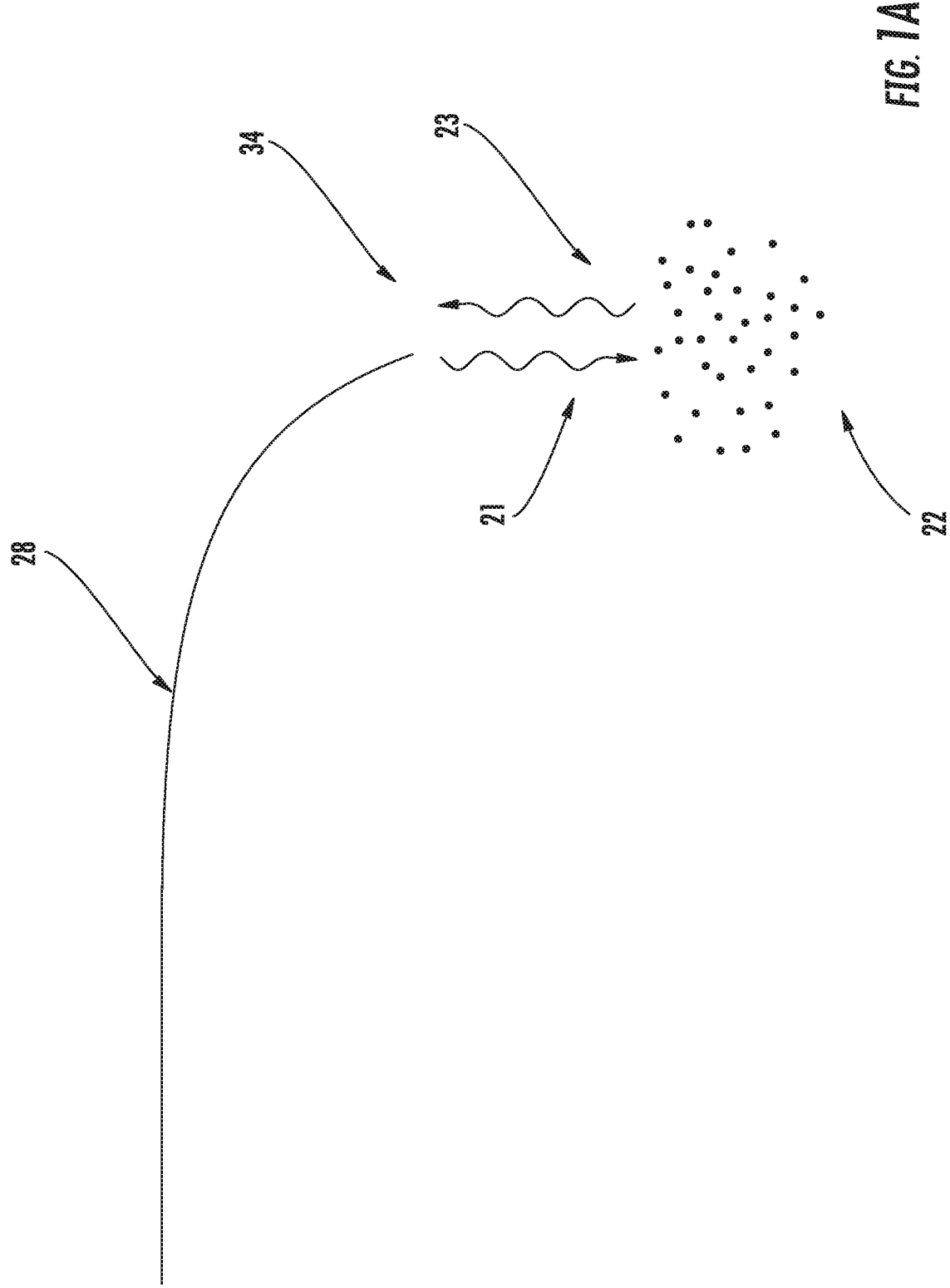

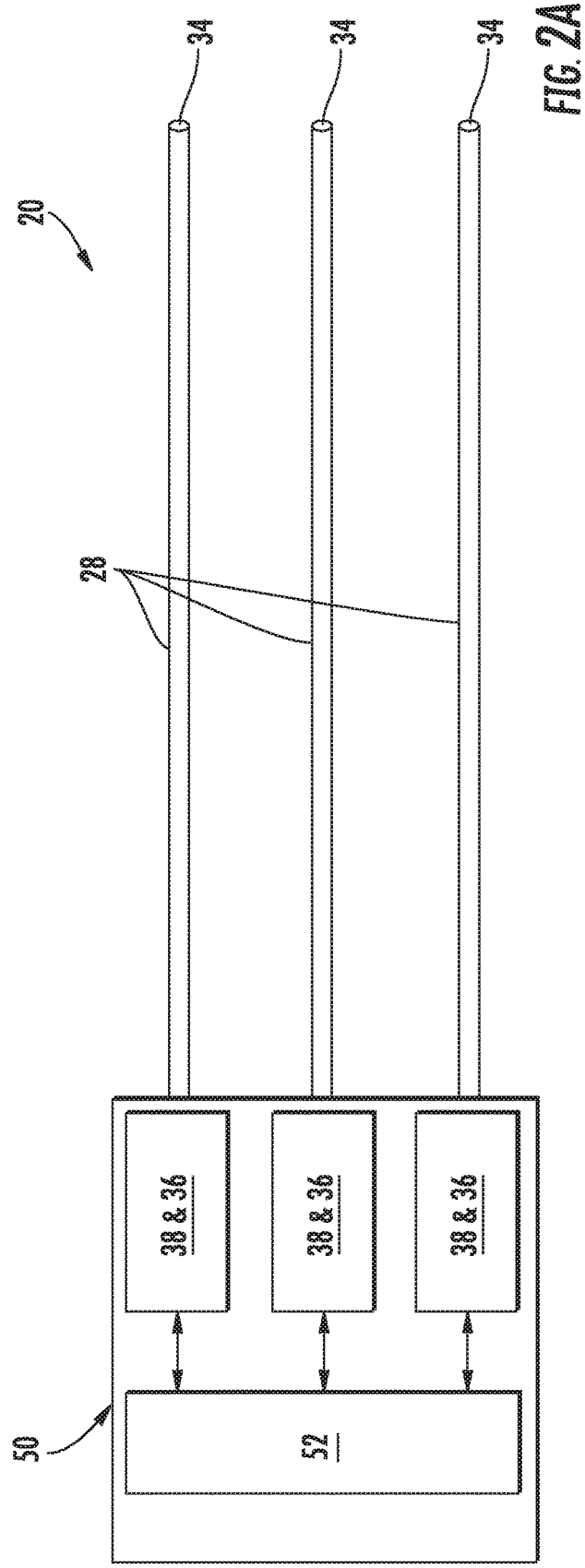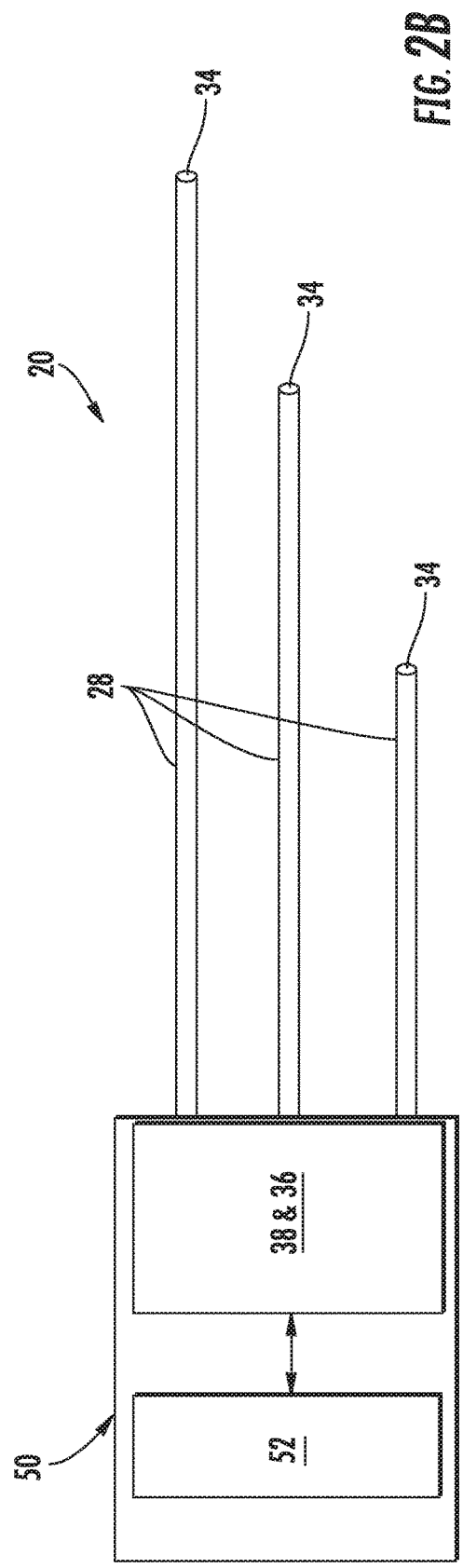

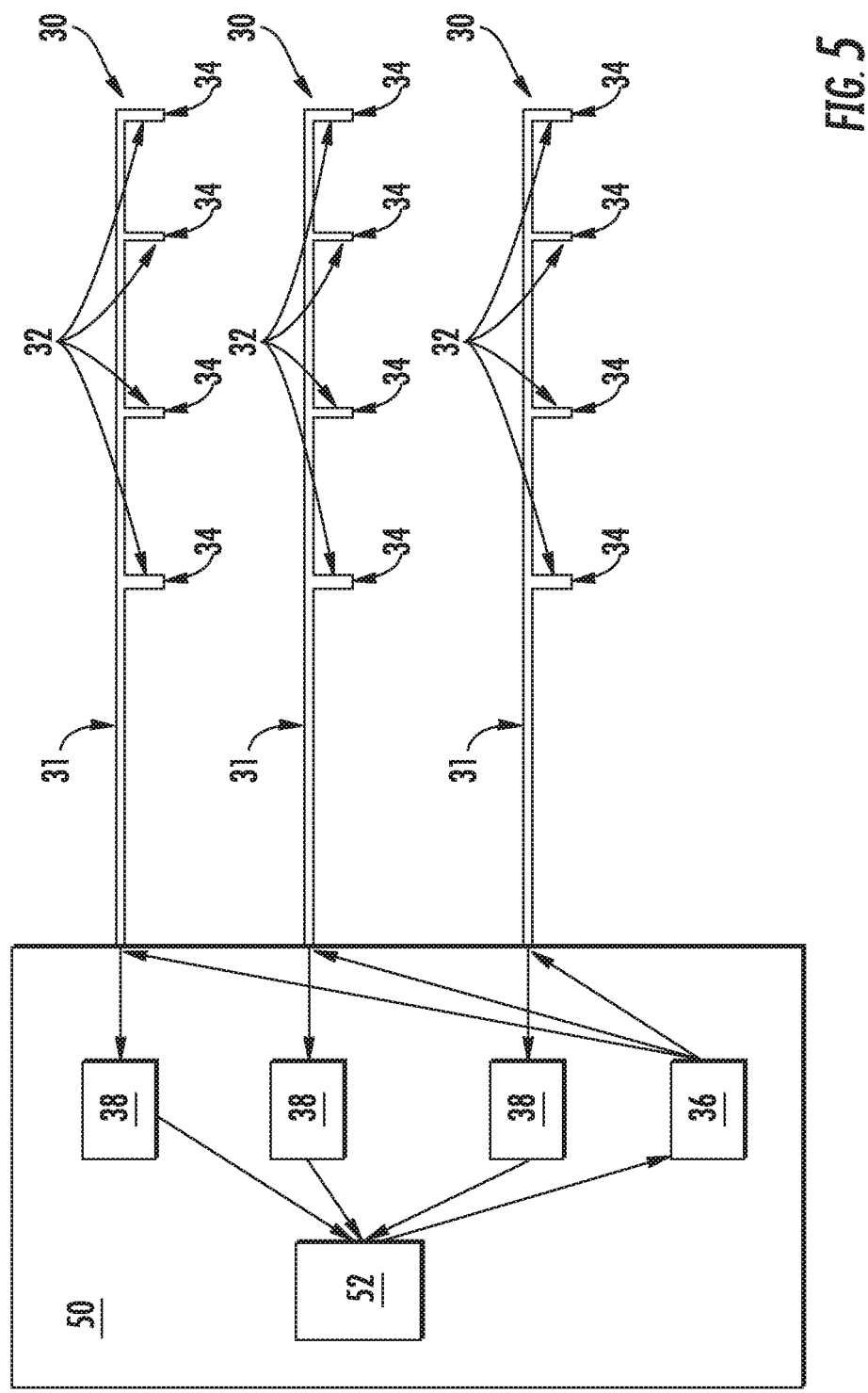

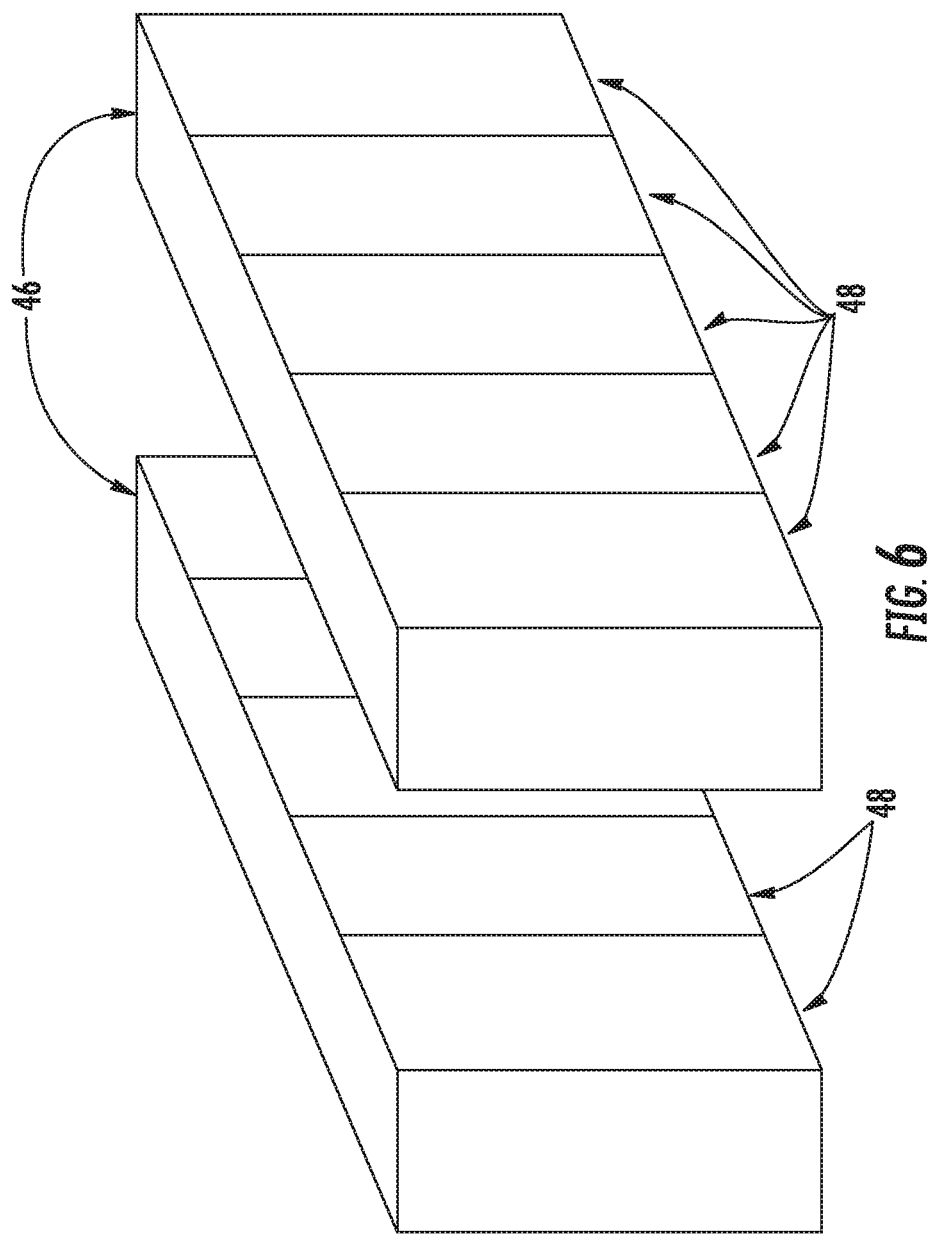

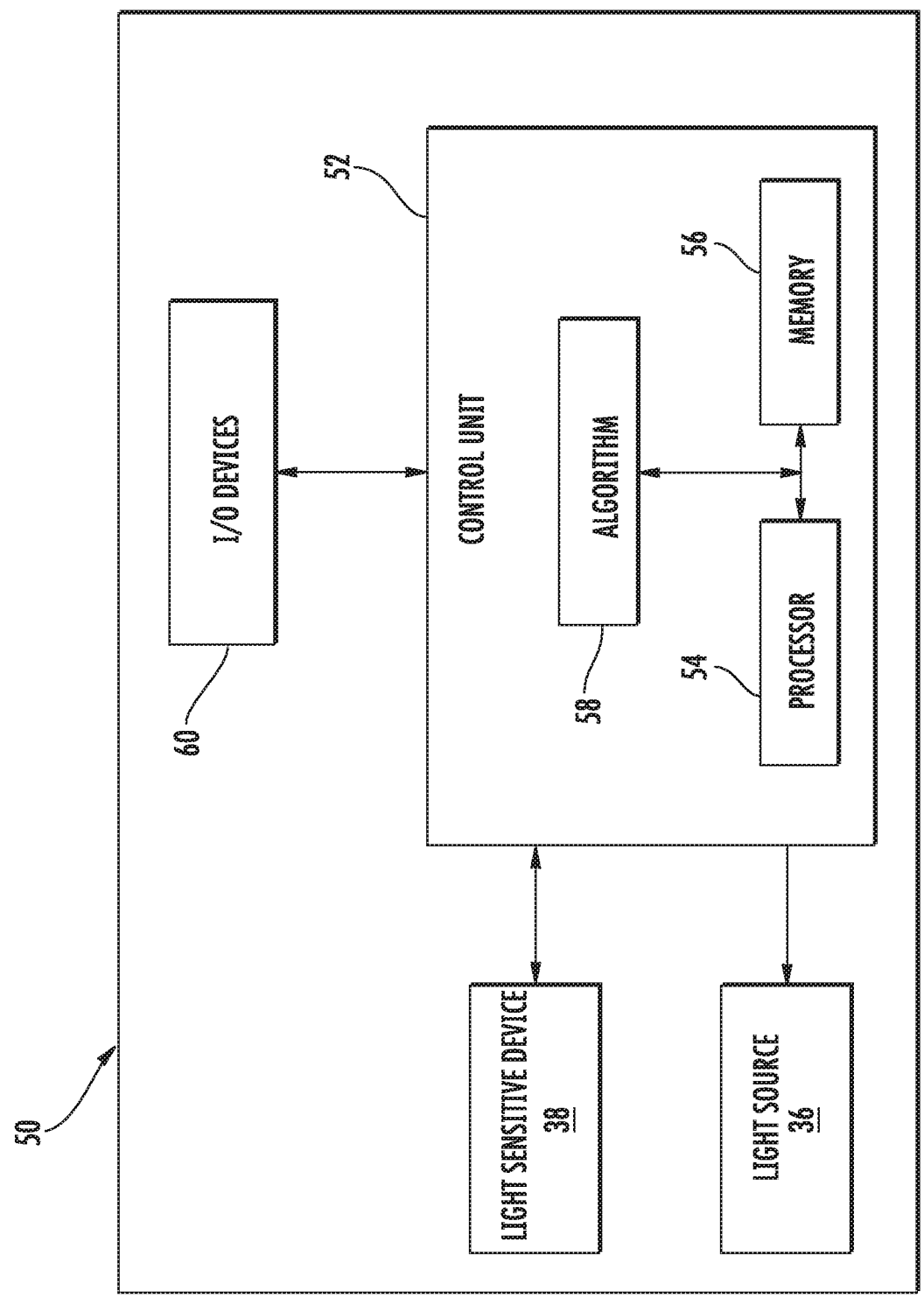

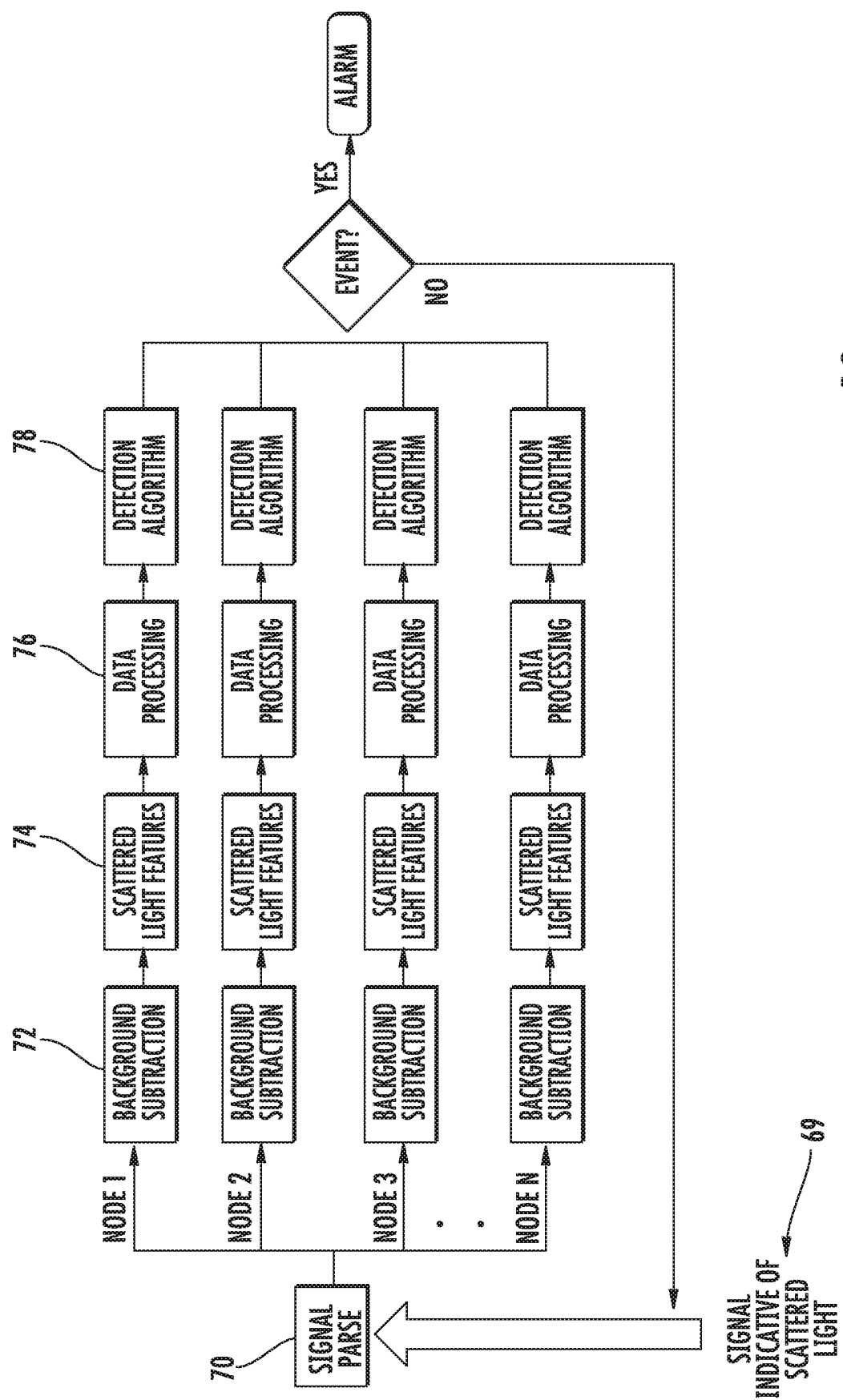

ENHANCED ROBUSTNESS FOR HIGH SENSITIVITY FIBER OPTIC SMOKE DETECTION

CROSS REFERENCE TO RELATED APPLICATIONS

This application is a National Stage application of PCT/US2019/041374 filed Jul. 11, 2019, which claims priority to U.S. Provisional application 62/697,550 filed Jul. 13, 2018, both of which are incorporated by reference in their entirety herein.

BACKGROUND

Embodiments of this disclosure relate generally to a system for detecting conditions within a predetermined space and, more particularly, to a fiber optic detection system.

Conventional smoke detection systems operate by detecting the presence of smoke or other airborne pollutants. Upon detection of a threshold level of particles, an alarm or other signal, such as a notification signal, may be activated and operation of a fire suppression system may be initiated.

High sensitivity smoke detection systems may incorporate a pipe network consisting of one or more pipes with holes or inlets installed at positions where smoke or pre-fire emissions may be collected from a region or environment being monitored. Air is drawn into the pipe network through the inlets, such as via a fan, and is subsequently directed to a detector. In some conventional smoke detection systems, individual sensor units may be positioned at each sensing location, and each sensor unit has its own processing and sensing components.

Delays in the detecting the presence of the fire may occur in conventional point smoke detectors and also pipe network detection systems, for example due to the smoke transport time. In pipe network detection systems, due to the size of the pipe network, there is a typically a time delay between when the smoke enters the pipe network through an inlet and when that smoke actually reaches the remote detector. In addition, because smoke or other pollutants initially enter the pipe network through a few of the inlets, the smoke mixes with the clean air provided to the pipe from the remainder of the inlets. As a result of this dilution, the smoke detectable from the smoke and air mixture may not exceed the threshold necessary to indicate the existence of a fire.

SUMMARY

According to a first embodiment, a detection system for measuring one or more conditions within a predetermined area includes a fiber optic cable including a first core for transmitting light to the ambient atmosphere adjacent a node and a second core for receiving scattered light from the ambient atmosphere adjacent the node. A discrimination assembly operably coupled to the first and second cores includes at least one focusing element and at least one optical enhancement device. The at least one optical enhancement device separates the scattered light received from the ambient atmosphere into a plurality of wavelengths. A control system operably coupled to the fiber optic cable receives the scattered light received from the ambient atmosphere. The scattered light received from the ambient atmosphere has a higher frequency than the light transmitted to the ambient atmosphere and only the scattered light having a desired wavelength is transmitted to the control system.

In addition to one or more of the features described above, or as an alternative, in further embodiments the at least one focusing element and at least one optical enhancement device of the discrimination assembly cooperate to perform Raman scattering.

In addition to one or more of the features described above, or as an alternative, in further embodiments the at least one optical enhancement device is arranged downstream from an in-line with the at least one focusing element.

In addition to one or more of the features described above, or as an alternative, in further embodiments comprising a cover plate having an internal cavity, the cover plate surrounding the node and the discrimination assembly such that the node is in communication with the internal cavity.

In addition to one or more of the features described above, or as an alternative, in further embodiments the focusing element orients light rays of the transmitted light to a focal point.

In addition to one or more of the features described above, or as an alternative, in further embodiments the focusing element includes a collimating lens.

In addition to one or more of the features described above, or as an alternative, in further embodiments the at least one optical enhancement device includes a first optical enhancement device and a second optical enhancement device.

In addition to one or more of the features described above, or as an alternative, in further embodiments the first optical enhancement device includes a bandpass filter.

In addition to one or more of the features described above, or as an alternative, in further embodiments the first optical enhancement device separates the scattered light received at the first optical enhancement device into a plurality of wavelengths.

In addition to one or more of the features described above, or as an alternative, in further embodiments the second optical enhancement device includes a microscope objective.

In addition to one or more of the features described above, or as an alternative, in further embodiments the scattered light received by the node is analyzed to determine whether a condition is present at the node.

In addition to one or more of the features described above, or as an alternative, in further embodiments the condition is smoke.

In addition to one or more of the features described above, or as an alternative, in further embodiments the scattered light is received from a sensing volume arranged at an intersection between an emitted light cone and a receiving light cone.

According to another embodiment, a method of evaluating an area for a condition including transmitting light from a first core of a fiber optic cable at a node, focusing the transmitted light via a discrimination assembly, transmitting the focused light into the area, scattering the focused light, separating the scattered light a plurality of wavelengths via the discrimination assembly, communicating the scattered light having a desired wavelength received at a second core of the node to a control system, and analyzing the scattered light to evaluate the condition within the area.

In addition to one or more of the features described above, or as an alternative, in further embodiments transmitting light from a first node of a fiber optic cable includes transmitting light from the first node into an internal cavity defined by a cover plate surrounding the node.

In addition to one or more of the features described above, or as an alternative, in further embodiments focusing the transmitted light further comprises passing the transmitted light through at least one of a focusing element and an optical enhancement device of the discrimination assembly.

In addition to one or more of the features described above, or as an alternative, in further embodiments transmitting the focused light into the area causes an interaction between the focused light and at least one particle, the interaction resulting in emission of at least one high frequency photon.

In addition to one or more of the features described above, or as an alternative, in further embodiments a frequency of the scattered light is higher than a frequency of the focused light.

In addition to one or more of the features described above, or as an alternative, in further embodiments separating the scattered light a plurality of wavelengths via the discrimination assembly further comprises passing the transmitted light through at least one of a focusing element and an optical enhancement device of the discrimination assembly.

In addition to one or more of the features described above, or as an alternative, in further embodiments only a portion of the scattered light received at the discrimination assembly is provided to the second core of the node.

In addition to one or more of the features described above, or as an alternative, in further embodiments the portion of light arranged at intersection between an emitted light cone and a receiving light cone is provided to the second core of the node.

In addition to one or more of the features described above, or as an alternative, in further embodiments analyzing the scattered light is used to evaluate a presence of smoke within the area.

According to another embodiment, a detection system for measuring a condition within a predetermined area includes a fiber optic cable including a first core for transmitting light to an ambient atmosphere adjacent a node and a second core for receiving scattered light from the ambient atmosphere. A first optical enhancement device disposed within the path defined by the first core. The first optical enhancement device imparting a first orientation to light as it passes through the first optical enhancement device. A second optical enhancement device disposed within the path defined by the second core, the second optical enhancement device allowing only scattered light having a second orientation to pass through the second optical enhancement device. A control system operably coupled to the fiber optic cable so that the scattered light having a second orientation complementary to the orientation of the second optical enhancement device is transmitted to the control system.

In addition to one or more of the features described above, or as an alternative, in further embodiments at least one of the first optical enhancement device and the second optical enhancement device includes a polarizer and lens that are configured to transmit light.

In addition to one or more of the features described above, or as an alternative, in further embodiments the first orientation and the second orientation are substantially identical.

In addition to one or more of the features described above, or as an alternative, in further embodiments the first orientation and the second orientation are different.

In addition to one or more of the features described above, or as an alternative, in further embodiments at least one of the first optical enhancement device and the second optical enhancement device is disposed at the node.

In addition to one or more of the features described above, or as an alternative, in further embodiments the control system further comprises a light sensing device, and the second optical enhancement device is disposed at the light sensing device.

In addition to one or more of the features described above, or as an alternative, in further embodiments the control system further comprises a light sensing device, and the second optical enhancement device is arranged between the node and the light sensing device.

In addition to one or more of the features described above, or as an alternative, in further embodiments the control system further comprises a light source operably coupled to the first core.

In addition to one or more of the features described above, or as an alternative, in further embodiments the light source emits a light within the range of 350 nm-1000 nm wavelength.

In addition to one or more of the features described above, or as an alternative, in further embodiments an emitter cone is formed adjacent an end of the first core, a receiving cone is formed adjacent an end of the second core, and a radial angle is defined between a centerline of the emitter cone and a centerline of the receiving cone, and a repose angle is defined between a surface of the node and the centerline of the emitter cone or the centerline of the receiving cone.

In addition to one or more of the features described above, or as an alternative, in further embodiments the radial angle and the repose angle are selected to detect scattered light having a substantially orthogonal configuration between the emitter cone and the receiving cone.

In addition to one or more of the features described above, or as an alternative, in further embodiments the radial angle and the repose angle are selected to detect back scattered light.

In addition to one or more of the features described above, or as an alternative, in further embodiments the radial angle and the repose angle are selected to detect forward scattered light.

In addition to one or more of the features described above, or as an alternative, in further embodiments the control system is additionally configured to receive scattered light having a third orientation.

In addition to one or more of the features described above, or as an alternative, in further embodiments the control system is operable to compare an intensity of the scattered light having the second orientation with an intensity of the scattered light having the third orientation.

According to another embodiment, a method of evaluating an area for a condition includes transmitting light from a first core of a fiber optic cable to an ambient atmosphere at a node, applying a first orientation to the transmitted light, receiving scattered light from the ambient atmosphere at the node at a second core of the fiber optic cable, communicating a portion of the scattered light having a second orientation to a control system, and analyzing the scattered light to evaluate the condition within the area.

In addition to one or more of the features described above, or as an alternative, in further embodiments applying a first orientation to the transmitted light further comprises passing the transmitted light through a first optical enhancement device having a first orientation.

In addition to one or more of the features described above, or as an alternative, in further embodiments communicating a portion of the scattered light having a second orientation to a control system further comprises providing the scattered light to a second optical enhancement device having the second orientation.

In addition to one or more of the features described above, or as an alternative, in further embodiments the first orientation and the second orientation are substantially identical.

In addition to one or more of the features described above, or as an alternative, in further embodiments the first orientation and the second orientation are different.

In addition to one or more of the features described above, or as an alternative, in further embodiments an orientation of the scattered light is determined in response to an interaction between the transmitted light having the first orientation and one or more particles within the area.

BRIEF DESCRIPTION OF THE DRAWINGS

The subject matter, which is regarded as the present disclosure, is particularly pointed out and distinctly claimed in the claims at the conclusion of the specification. The foregoing and other features, and advantages of the present disclosure are apparent from the following detailed description taken in conjunction with the accompanying drawings in which:

FIG. 1 is schematic diagram of a detection system according to an embodiment;

FIG. 1A is a schematic diagram of light transmission at a node of a detection system according to an embodiment;

FIG. 2A is a schematic diagram of a detection system according to another embodiment;

FIG. 2B is a schematic diagram of a detection system according to another embodiment;

FIG. 5 is a schematic diagram of a detection system including a plurality of fiber harnesses according to an embodiment;

FIG. 6 is a perspective view of an area within a building to be monitored by a detection system according to an embodiment;

FIG. 7 is a schematic diagram of a control system of the detection system according to an embodiment;

FIG. 10 is a schematic diagram of process flow for evaluating the signals generated by the light sensitive device according to an embodiment;

Figure 3:
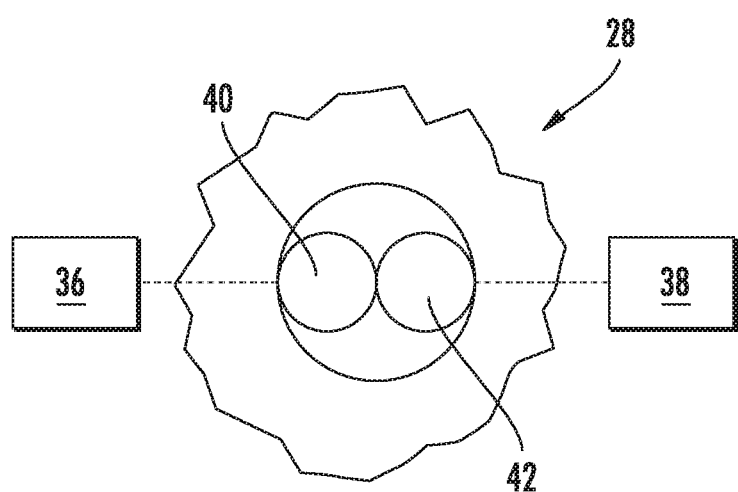
FIG. 3 is a cross-sectional view of a fiber optic node of the fiber harness of FIG. 1 according to an embodiment.

The detailed description explains embodiments of the present disclosure, together with advantages and features, by way of example with reference to the drawings.

DETAILED DESCRIPTION

Referring now to the FIGS., a system 20 for detecting one or more conditions or events within a designated area is illustrated. The detection system 20 may be able to detect one or more hazardous conditions, including but not limited to the presence of smoke, fire, temperature, flame, or any of a plurality of pollutants, combustion products, or chemicals. Alternatively, or in addition, the detection system 20 may be configured to perform monitoring operations of people, lighting conditions, or objects. In an embodiment, the system 20 may operate in a manner similar to a motion sensor, such as to detect the presence of a person, occupants, or unauthorized access to the designated area for example. The conditions and events described herein are intended as an example only, and other suitable conditions or events are within the scope of the disclosure.

The detection system 20 uses light to evaluate a volume for the presence of a condition. In this specification, the term "light" means coherent or incoherent radiation at any frequency or a combination of frequencies in the electromagnetic spectrum. In an example, the photoelectric system uses light scattering to determine the presence of particles in the ambient atmosphere to indicate the existence of a predetermined condition or event. In this specification, the term "scattered light" may include any change to the amplitude/intensity or direction of the incident light, including reflection, refraction, diffraction, absorption, and scattering in any/all directions. In this example, light is emitted into the designated area; when the light encounters an object (a person, smoke particle, or gas molecule for example), the light can be scattered and/or absorbed due to a difference in the refractive index of the object compared to the surrounding medium (air). Depending on the object, the light can be scattered in all different directions. Observing any changes in the incident light, by detecting light scattered by an object for example, can provide information about the designated area including determining the presence of a predetermined condition or event.

In its most basic form, as shown in FIG. 1, the detection system 20 includes a single fiber optic cable 28 with at least one fiber optic core. The term fiber optic cable 28 includes any form of optical fiber. As examples, an optical fiber is a length of cable that is composed of one or more optical fiber cores of single-mode, multimode, polarization maintaining, photonic crystal fiber or hollow core. Each cable may have a length of up to 5000 m. A node 34 is located at the termination point of a fiber optic cable 28 and is inherently included in the definition of a fiber optic cable 28. The node 34 is positioned in communication with the ambient atmosphere. A light source 36, such as a laser diode for example, and a light sensitive device 38, such as a photodiode for example, are coupled to the fiber optic cable 28. A control system 50 of the detection system 20 including a control unit 52, discussed in further detail below, is utilized to manage the detection system operation and may include control of components, data acquisition, data processing and data analysis.

As shown in FIG. 1A, the light from the light source 36 is transmitted through fiber optic cable 28 and through the node 34 to the surrounding area, illustrated schematically at 21. The light 21 interacts with one or more particles indicative of a condition, illustrated schematically at 22, and is reflected or transmitted back to the node 34, illustrated schematically at 23. A comparison of the light provided to the node 34 from the light source 36 and/or changes to the light reflected back to the light sensitive device 38 from the node 34 will indicate whether or not changes in the atmosphere, such as particles 22 for example, are present in the ambient atmosphere adjacent the node 34 that are causing the scattering of the light. The scattered light as described herein is intended to additionally include reflected, transmitted, and absorbed light. Although the detection system 20 is described as using light scattering to determine a condition or event, embodiments where light obscuration, absorption, and fluorescence is used in addition to or in place of light scattering are also within the scope of the disclosure.

In another embodiment, the detection system 20 can include a plurality of nodes 34. For example, as illustrated in FIG. 2A, a plurality of fiber optic cables 28 and corresponding nodes 34 are each associated with a distinct light sensitive device 38. In embodiments where an individual light sensitive device 38 is associated with each node 34, as shown in FIG. 2A, the signal output from each node 34 can be monitored. Upon detection of a predetermined event or condition, it will be possible to localize the position of the event because the position of each node 34 within the system 20 is known. Alternately, as shown in FIG. 2B, a plurality of fiber optic cables 28, may be coupled to a single light source 36 and/or light sensitive device 38.

In embodiments where a single light sensitive device 38 is configured to receive scattered light from a plurality of nodes 34, the control system 50 is able to localize the scattered light, i.e. identify the scattered light received from each of the plurality of nodes 34. For example, the control system 50 may use the position of each node 34, specifically the length of the fiber optic cables 28 associated with each node 34 and the corresponding time of flight (i.e. the time elapsed between when the light was emitted by the light source 36 and when the scattered light was received by the light sensitive device 38), to associate different portions of the light signal with each of the respective nodes 34 that are connected to that light sensitive device 38. Alternatively, or in addition, the time of flight may include the time elapsed between when the light is emitted from the node 34 and when the scattered light is received back at the node 34. In such embodiments, the time of flight provides information regarding the distance of the object or particle relative to the node 34.

In an embodiment, illustrated in the cross-section of the fiber optic cable shown in FIG. 3, two substantially identical and parallel light transmission fiber cores 40, 42 are included in the fiber optic cable 28 and terminate at the node 34 (not shown in FIG. 3). However, it should be understood that embodiments are also contemplated herein where the fiber optic cable 28 includes only a single fiber core, or more than two cores. In an embodiment, the light source 36 is coupled to the first fiber core 40 and the light sensitive device 38 is coupled to the second fiber core 42, for example near a first end of the fiber optic cable 28. The light source 36 is selectively operable to emit light, which travels down the first fiber core 40 of the fiber optic cable 28 to the node 34. At the node 34, the emitted light is expelled into the adjacent atmosphere. The light is scattered and transmitted back into the node 34 and down the fiber cable 28 to the light sensitive device 38 via the second fiber core 42.

Figure 4A:
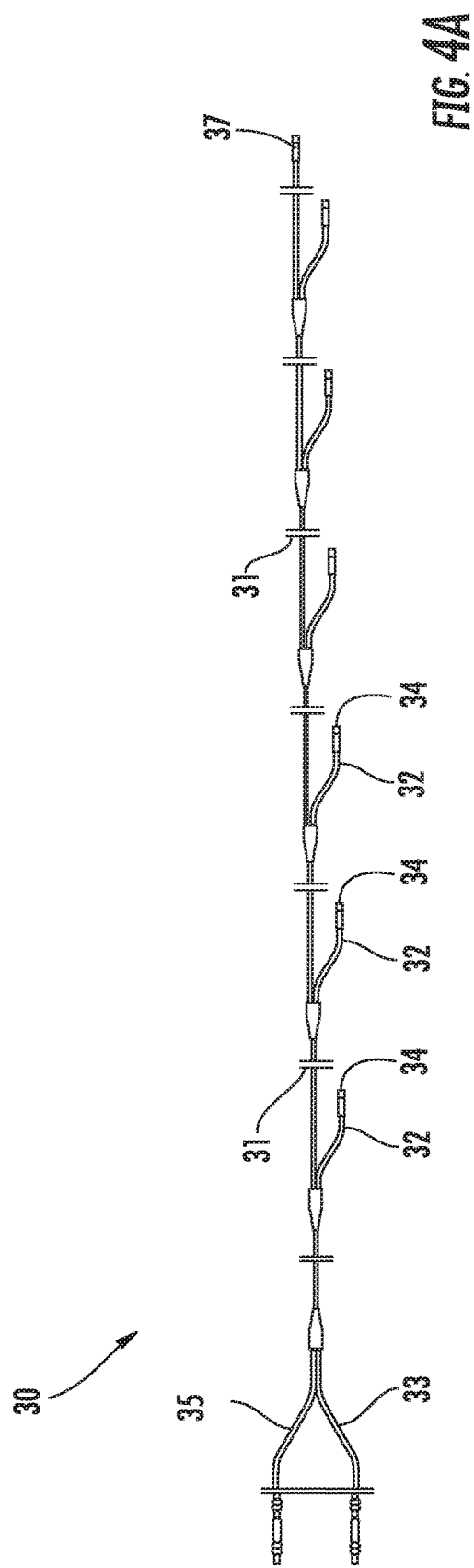
FIG. 4A is a side view of a fiber harness of a detection system according to an embodiment.
Figure 4B:
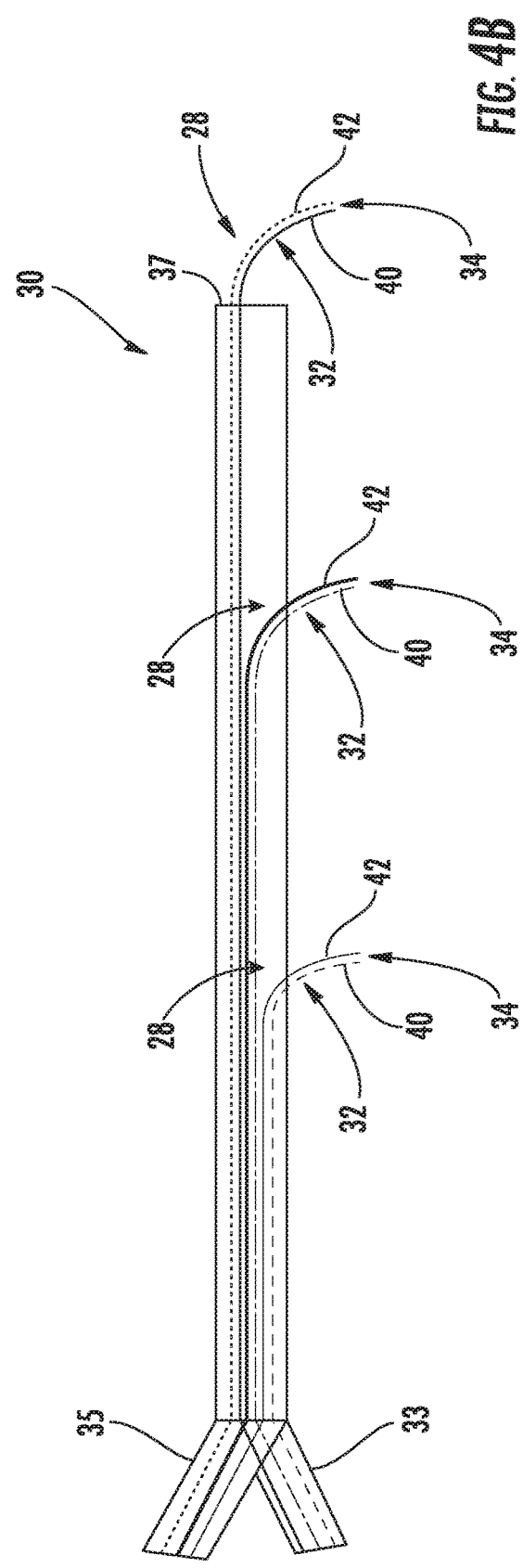
FIG. 4B is a schematic diagram of a fiber harness of a detection system according to an embodiment.

In more complex embodiments, as shown in FIGS. 4A and 4B, rather than having a plurality of individual fiber optic cables 28 separately coupled to the control unit 50, the detection system 20 includes a fiber harness 30. The fiber harness 30 may be formed by bundling a plurality of fiber optic cables 28, or the cores associated with a plurality of fiber optic cables 28, together within a single conduit or sheath for example. However, it should be understood that embodiments where the fiber harness 30 includes only a single fiber optic cable 28 or the cores associated therewith are also contemplated herein.

Structural rigidity is provided to the fiber harness 30 via the inclusion of one or more fiber harness backbones 31. As shown in the FIG., in embodiments where the fiber harness 30 includes a plurality of fiber optic cables 28, the plurality of cables 28 may be bundled together at one or more locations, upstream from the end of each cable 28. The end of each fiber optic cable 28, and therefore the end of each core associated with the cable 28, is separated from the remainder of the fiber optic cables 28 at an adjacent, downstream backbone 31 formed along the length of the fiber harness 30. Each of these free ends defines a fiber optic branch 32 of the fiber harness 30 and has a node 34 associated therewith. For example, as best shown in FIG. 4B, each fiber optic branch 32 includes the free ends of cores 40, 42 that define a node 34 of a corresponding fiber optic cable 28.

In the illustrated, non-limiting embodiments of FIGS. 4A and 4B, the fiber harness 30 additionally includes an emitter leg 33 and a receiver leg 35 associated with each of the plurality of fiber optic branches 32. The emitter leg 33 may contain the first fiber optic cores 40 from each of the plurality of fiber optic branches 32 and the receiver leg 35 may contain all of the second fiber cores 42 from each of the fiber optic branches 32. The length of each pair of fiber optic cores 40, 42 extending between the emitter leg 33 or the receiver leg 35 and a node 34 may vary in length. As a result, each node 34, defined by the cores 40, 42 at the end of each fiber optic branch 32, may be arranged at a distinct location along the fiber harness 30. Accordingly, the position of each of the nodes 34 relative to the fiber harness 30 may be controlled by the length of the cores 40, 42 associated with each node 34. The position of each of the nodes 34 may be set during manufacture, or at the time of installation of the system 20. With this variation in length and therefore position of each node 34, only the longest core or pair of cores 40, 42 is supported at the final backbone 31 located upstream from the end 37 of the harness 30.

Alternatively, the fiber harness 30 may include a fiber optic cable (not shown) having a plurality of branches 32 integrally formed therewith and extending therefrom. The branches 32 may include only a single fiber optic core. The configuration, specifically the spacing of the nodes 34 within a fiber harness 30 may be arranged at locations substantially equidistant from one another. Alternatively, the distance between a first node and a second node may be distinct than the distance between the second node and a third node. In an embodiment, the positioning of each node 34 may correlate to a specific location within the designated area. It is understood that there is no minimum spacing required between adjacent nodes 34.

With reference now to FIG. 5, the detection system 20 may additionally include a plurality of fiber harnesses 30. In the illustrated, non-limiting embodiment, a distinct light sensitive device 38 is associated with each of the plurality of fiber harnesses 30, and more specifically with each of the plurality of light transmission cores 42 within the harnesses 30. However, embodiments where a single light sensitive device 38 is coupled to the plurality of fiber harnesses 30 are also contemplated here. In addition, a single light source 36 may be operably coupled to the plurality of light transmission fiber cores 40 within the plurality of fiber harnesses 30 of the system 20. Alternatively, the detection system 20 may include a plurality of light sources 36, each of which is coupled to one or more of the plurality of fiber harnesses 30.

The detection system 20 may be configured to monitor a predetermined area, such as a building for example. In an embodiment, the detection system 20 is utilized for predetermined areas having a crowded environment, such as a server room, as shown in FIG. 6. In such embodiments, each fiber harness 30 may be aligned with one or more rows of equipment 46, and each node 34 therein may be located directly adjacent to one of the towers 48 within the rows 46. In addition, the nodes 34 may be arranged so as to monitor specific enclosures, electronic devices, or machinery within the crowded environment. Positioning of the nodes 34 in such a manner allows for earlier detection of a condition as well as localization, which may limit the exposure of the other equipment in the room to the same condition. For example, if a hazardous condition such as overheat, smoke and/or fire were to effect one or more specific pieces of equipment in one or more towers 48, a node 34 physically arranged closest to the tower 48 and/or closest to the equipment may detect the smoke, fire, temperature, and/or flame. Further, since the location of node 34 is known, suppressive or preventative measures may be quickly deployed in the area directly surrounding the node 34, but not in areas where the hazardous condition has not detected. In another application, the detection system 20 may be integrated into an aircraft, such as for monitoring a cargo bay, avionics rack, lavatory, or another confined region of the aircraft that may be susceptible to fires or other events.

The control system 50 of the detection system 20 is utilized to manage the detection system operation and may include control of components, data acquisition, data processing and data analysis. The control system 50, illustrated in FIG. 7, includes at least one light sensitive device 38, at least one light source, 36, and a control unit 52, such as a computer having one or more processors 54 and memory 56 for implementing one or more algorithms 58 as executable instructions that are executed by the processor 54. The instructions may be stored or organized in any manner at any level of abstraction. The processor 54 may be any type of processor, including a central processing unit ("CPU"), a general purpose processor, a digital signal processor, a microcontroller, an application specific integrated circuit ("ASIC"), a field programmable gate array ("FPGA"), or the like. Also, in some embodiments, memory 56 may include random access memory ("RAM"), read only memory ("ROM"), or other electronic, optical, magnetic, or any other computer readable medium for storing and supporting processing in the memory 56. In addition to being operably coupled to the at least one light source 36 and the at least one light sensitive device 38, the control unit 52 may be associated with one or more input/output devices 60. In an embodiment, the input/output devices 60 may include an alarm or other signal, or a fire suppression system which are activated upon detection of a predefined event or condition.

It should be understood herein that the term alarm, as used herein, may indicate any of the possible outcomes of a detection.

The control unit 52, and in some embodiments, the processor 54, may be coupled to the at least one light source 36 and the at least one light sensitive device 38 via connectors. The light sensitive device 38 is configured to convert the scattered light received from a node 34 into a corresponding signal receivable by the processor 54. In an embodiment, the signal generated by the light sensing device 38 is an electronic signal. The signal output from the light sensing device 38 is then provided to the control unit 52 for processing via the processor 54 using an algorithm 58 to determine whether a predefined condition is present.

The signal received by or outputted from the light sensitive device(s) 38 may be amplified and/or filtered, such as by a comparator (not shown), to reduce or eliminate irrelevant information within the signal prior to being communicated to the control unit 52 located remotely from the node 34. In such embodiments, the amplification and filtering of the signal may occur directly within the light sensing device 38, or alternatively, may occur via one or more components disposed between the light sensing device 38 and the control unit 52. The control unit 52 may control the data acquisition of the light sensitive device 38, such as by adjusting the gain of the amplifier, the bandwidth of filters, sampling rates, the amount of timing and data buffering for example.

Figure 8:
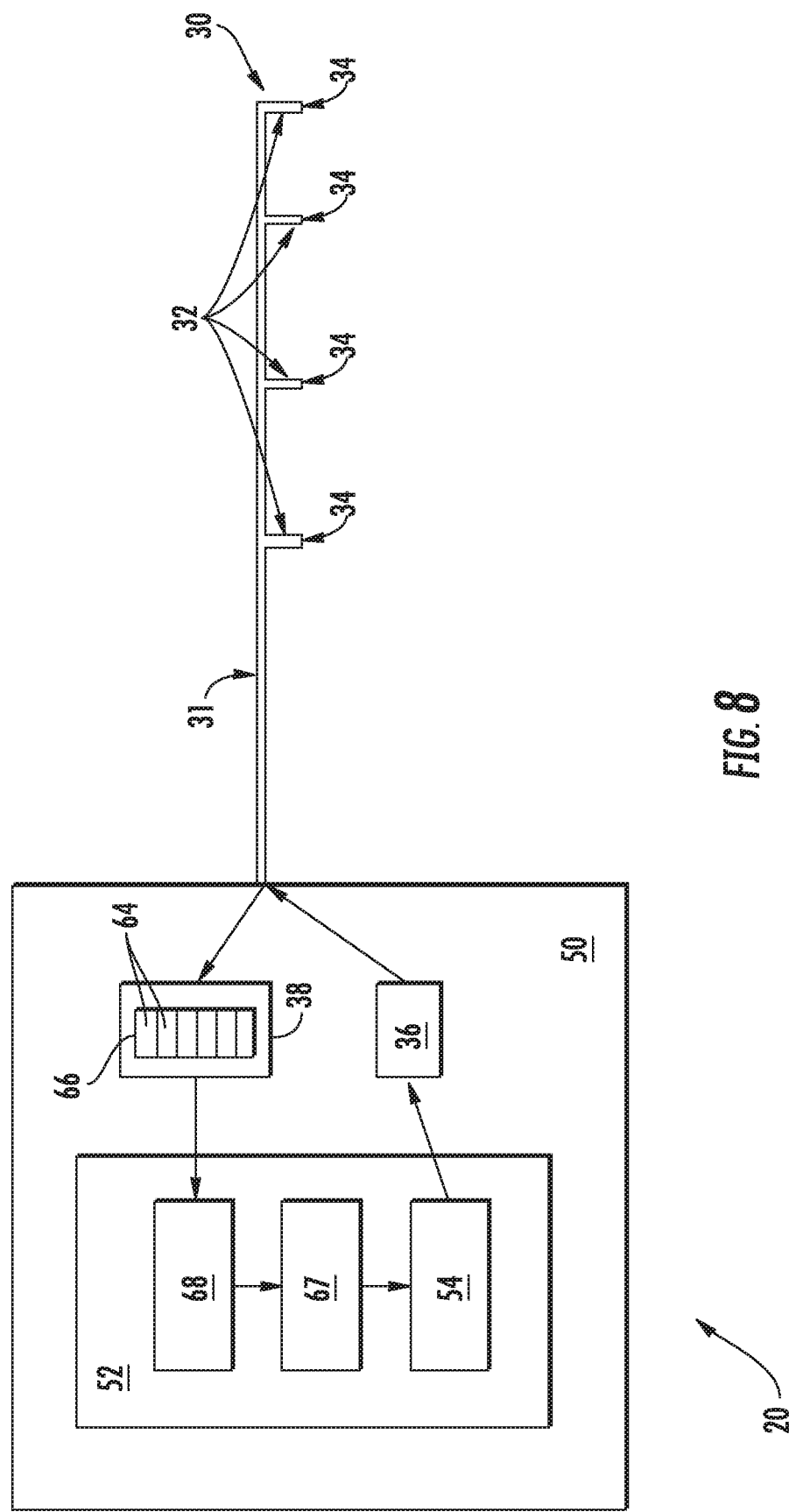
FIG. 8 is another schematic diagram of a detection system including an avalanche photo diode sensor according to an embodiment.

With reference now to FIG. 8, in an embodiment of the system 20, the light sensitive device 38 may include one or more Avalanche Photodiode (APD) sensors 64. For example, an array 66 of APD sensors 64 may be associated with the one or more fiber harnesses 30. In an embodiment, the number of APD sensors 64 within the sensor array 66 is equal to or greater than the total number of fiber harnesses 30 operably coupled thereto. However, embodiments where the total number of APD sensors 64 within the sensor array 66 is less than the total number of fiber harnesses 30 are also contemplated herein.

Data representative of the output from each APD sensor 64 in the APD array 66 is periodically taken by a switch 68, or alternatively, is collected simultaneously. The data acquisition 67 collects the electronic signals from the APD and associates the collected signals with metadata. The metadata as an example can be time, frequency, location or node. In an example, the electronic signals from the APD sensor 64 are synchronized to the laser modulation such that the electrical signals are collected for a period of time that starts when the laser is pulsed to several microseconds after the laser pulse. The data will be collected and processed by the processor 54 to determine whether any of the nodes 34 indicates the existence of a predefined condition or event. In an embodiment, only a portion of the data outputted by the sensor array 66 is collected, for example the data from a first APD sensor 64 associated with a first fiber harness 30. The switch 68 may therefore be configured to collect information from the various APD sensors 64 of the sensor array 66 sequentially. While the data collected from a first APD sensor 64 is being processed to determine if an event or condition has occurred, the data from a second APD 66 of the sensor array 66 is collected and provided to the processor 54 for analysis. When a predefined condition or event has been detected from the data collected from one of the APD sensors 64, the switch 68 may be configured to provide additional information from the same APD sensor 64 to the processor 54 to track the condition or event.

In an embodiment, a single control unit 52 can be configured with up to 16 APDs and the corresponding light sensitive devices 38 necessary to support up to 16 fiber harnesses 30, each fiber harness 30 having up to 30 nodes, resulting in a system with up to 480 nodes that can cover an area being monitored of up to 5000 square meters $m^2$. However, it should be understood that the system can be reconfigured to support more or fewer nodes to cover large buildings with up to a million $m^2$ or small enclosures with 5 $m^2$. The larger coverage area enables reducing or removing fire panels, high sensitivity smoke detectors and/or control panels.

Further, the overall area that can be monitored by a single node 34 of the detection system 20 is typically specified by code such as NFPA/UL/FM/EN/BSI/ISO. Accordingly, a single node 34 as described herein may be operable to monitor an area between about 0.1 $m^2$ to about 100 $m^2$ based on the code being applied. In an embodiment, a single node 34 made be operable to monitor an area of up to 40,000 $m^2$; however, this capability is limited by both laser power and collection optics. If eye safety limitations were not applicable, the area monitored by a single node 34 could be increased to up to about 4,000,000 $m^2$ of open area.

Figure 9:
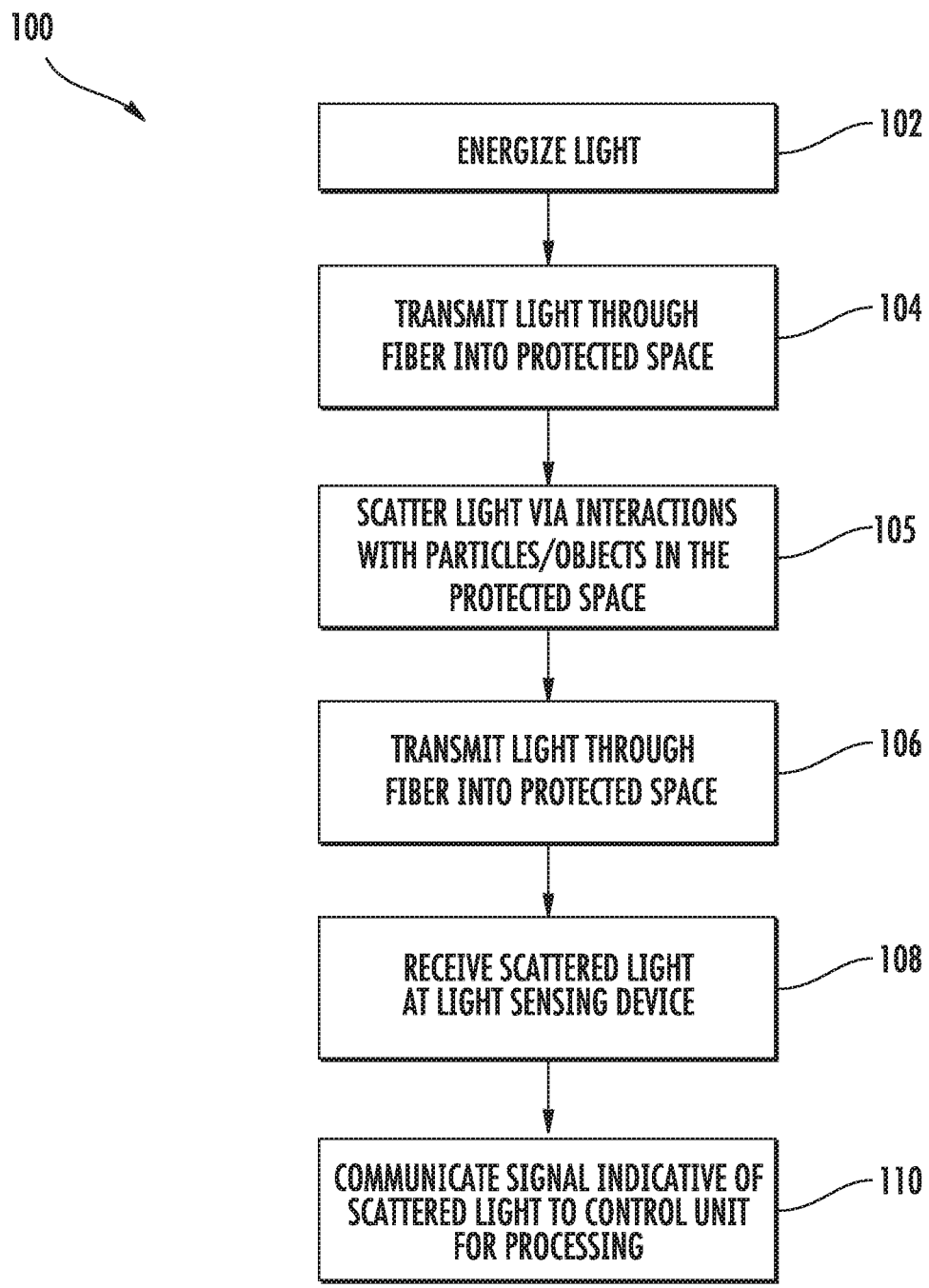
FIG. 9 is a method of operating a detection system according to an embodiment.

A method of operation 100 of the detection system 20 is illustrated in FIG. 9. The control unit 52 operably coupled to the light source 36 is configured to selectively energize the light source 36, as shown in block 102, and to emit light to a fiber harness 30 coupled thereto as shown in block 104. Based on the desired operation of the detection system 20, the control unit 52 may vary the intensity, duration, repetition, frequency, or other properties, of the light emitted. The light is transmitted through the fiber optic cable 28 and emitted at the node/nodes 34 into the protected space or area being monitored. At block 105, the light emitted into the area being monitored scatters as it interacts with particles or solid objects located within the space. In block 106, the scattered light is transmitted back through the fiber optic cable 28 via the second fiber cores 42. The scattered light may include one or more of scattered light that reflects from an interior of the fiber optic branch 32, and scattered light within the atmosphere adjacent the node 34 which is received by the node 34 and then, as already described, transmitted back through the fiber optic branches 32 via the second fiber cores 42. The scattered light is transmitted to the at least one light sensing device 38 in block 108. As shown in block 110, the light sensing device 38 generates a signal in response to the scattered light received by each node 34, and provides that signal to the control unit 52 for further processing.

Using one or more algorithms 58 executed by the processor 54, each signal representing the scattered light received by each of the corresponding nodes 34 is evaluated to determine whether the light at the node 34 is indicative of a predefined condition, such as smoke for example. With reference to FIG. 10, a schematic diagram illustrating an example of a flow path for processing the signals generated by each of the nodes 34 is illustrated. As shown, the signal indicative of scattered light 69 is parsed, shown at block 70, into a plurality of signals based on their respective originating node 34. In the illustrated, non-limiting embodiment, background signals, illustrated schematically at 72, are subtracted from the data before the pulse features are evaluated for each of the individual signals. Through integration, pulse compression, and/or feature extraction, shown at block 74, one or more characteristics or features (pulse features) of the signal may be determined. Examples of such features include, but are not limited to, a peak height, an area under a curve defined by the signal, statistical characteristics such as mean, variance, and/or higher-order moments, correlations in time, frequency, space, and/or combinations thereof, and empirical features as determined by deep learning, dictionary learning, and/or adaptive learning and the like.

In an embodiment, the time of flight record is parsed and features are extracted. The time of flight record can cover a period of time. For example, a time of flight record can record light intensity over 0.001-1,000,000 nanoseconds, 0.1-100,000 nanoseconds, or 0.1-10,000 microseconds. The features extracted from the signal can include, but are not limited to height, full width at half maximum, signal pick up time, signal drop off time, group velocity, integration, rate of change, mean, and variance for example.

Through application of the data processing, illustrated schematically at block 76, the features may then be further processed by using, for example, smoothing, Fourier transformation or cross correlation. In an embodiment, the processed data is then sent to the detection algorithm at block 78 to determine whether or not the signal indicates the presence and/or magnitude of a condition or event at a corresponding node 34. This evaluation may be a simple binary comparison that does not identify the magnitude of deviation between the characteristic and a threshold. The evaluation may also be a comparison of a numerical function of the characteristic or characteristics to a threshold. The threshold may be determined a priori or may be determined from the signal. The determination of the threshold from the signal may be called background learning. Background learning may be accomplished by adaptive filtering, model-based parameter estimation, statistical modeling, and the like. In some embodiments, if one of the identified features does not exceed a threshold, the remainder of the detection algorithm is not applied in order to reduce the total amount of processing performed during the detection algorithm. In the event that the detection algorithm indicates the presence of the condition at one or more nodes 34, an alarm or fire suppression system may, but need not be activated. It should be understood that the process for evaluating the data illustrated and described herein is intended as an example only and that other processes including some or all of the steps indicated in FIG. 10 are also contemplated herein.

The process for evaluating the data set forth in steps 70-78 of FIG. 10 may also advantageously employ classifiers including those that may be learned from the signal via deep learning techniques including, but not limited to deep neural networks, convolutional neural networks, recursive neural networks, dictionary learning, bag of visual/depth word techniques, Support Vector Machine (SVM), Decision Trees, Decision Forests, Fuzzy Logic, and the like. The classifiers may also be constructed using Markov Model techniques, Hidden Markov Models (HMM), Markov Decision Processes (MDP), Partially Observable MDPs, Markov Decision Logic, Probabilistic Programming, and the like.

In addition to evaluating the signals generated from each node 34 individually, the processor 54 may additionally be configured to evaluate the plurality of signals or characteristics thereof collectively, such as through a data fusion operation to produce fused signals or fused characteristics. The data fusion operation may provide information related to time and spatial evolution of an event or predetermined condition. As a result, a data fusion operation may be useful in detecting a lower level event, insufficient to initiate an alarm at any of the nodes 34 individually. For example, in the event of a slow burning fire, the light signal generated by a small amount of smoke near each of the nodes 34 individually may not be sufficient to initiate an alarm. However, when the signals from the plurality of nodes 34 are reviewed in aggregate, the increase in light returned to the light sensitive device 38 from multiple nodes 34 may indicate the occurrence of an event or the presence of an object not otherwise detected. In an embodiment, the fusion is performed by Bayesian Estimation. Alternatively, linear or non-linear joint estimation techniques may be employed such as maximum likelihood (ML), maximum a priori (MAP), non-linear least squares (NNLS), clustering techniques, support vector machines, decision trees and forests, and the like.

As illustrated and described above, the processor 54 is configured to analyze the signals generated by at least one light sensing device 38 relative to time. In another embodiment, the detection algorithm may be configured to apply one or more of a Fourier transform, Wavelet transform, space-time transform, Choi-Williams distribution, Wigner-Ville distribution and the like, to the signals to convert the signals from a temporal domain to a frequency domain. This transformation may be applied to the signals when the nodes 34 are being analyzed individually, when the nodes 34 are being analyzed collectively during a data fusion, or both.

The relationship between the light scattering and the magnitude or presence of a condition is inferred by measuring a signal's causality and dependency. As an example, the measure of a causality utilizes one or more signal features as an input and determines one or more outputs from a calculation of a hypothesis testing method, foreground ratio, second derivative, mean, or Granger Causality Test. Similarly, one or more signal features may be used as an input to evaluate the dependency of a signal. One or more outputs are selected from a calculation of a correlation, fast Fourier transform coefficients, a second derivative, or a window. The magnitude and presence of the condition is then based on the causality and dependency. The magnitude and presence of a condition may be calculated utilizing one or more evaluation approaches: a threshold, velocity, rate of change or a classifier. The detection algorithm may include utilizing the output from the calculation causality, dependency or both. This is used to indicate the presence of the condition at one or more nodes 34 and initiate a response.

When smoke is present within the ambient environment adjacent a node 34, the frequency effects of the light vary within a small range, such as from about 0.01 Hz to about 10 Hz for example. As a result, the evaluation of the frequency of the signals of scattered light may effectively and accurately determine the presence of smoke within the predetermined space 82. The detection algorithm may be configured to evaluate the signals in a fixed time window to determine the magnitude of the frequency or the strength of the motion of the smoke. Accordingly, if the magnitude of a frequency component exceeds a predetermined threshold, the algorithm 58 may initiate an alarm indicating the presence of a fire. In an embodiment, the predetermined threshold is about 10 Hz such that when the magnitude of the optical smoke frequency exceeds the threshold, a determination is made that smoke is present.

Figure 11B:
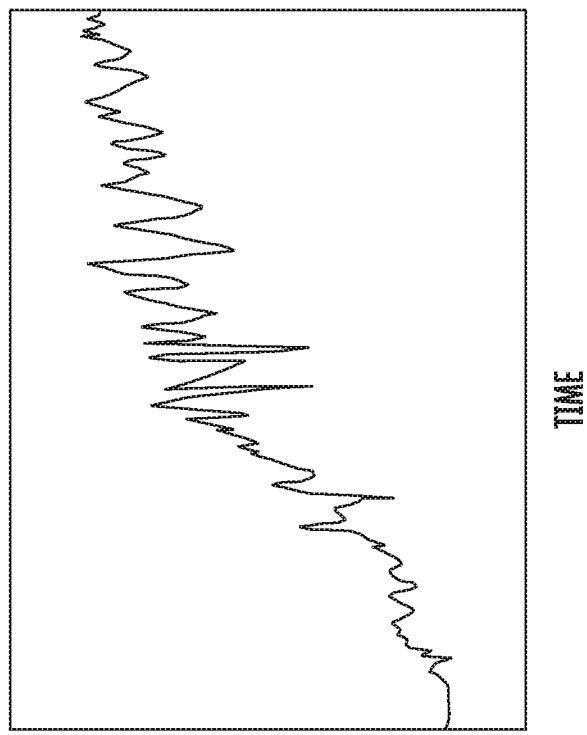
FIGS. 11A and 11B are diagrams illustrating the signals recorded by the detection system over time for various predefined conditions or events according to an embodiment.
Figure 11A:
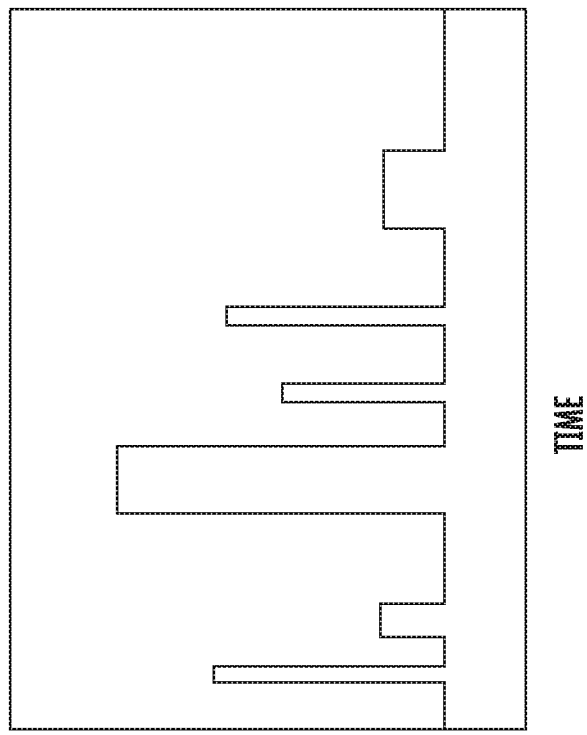

In an embodiment, the algorithm 58 is configured to distinguish between different events or conditions based on the rate of change in the light scattered by the atmosphere near the node 34 and received by one or more of the nodes 34 over time. With reference to FIGS. 11A and 11B, graphs of the signals recorded from a node 34 over time with respect to different events are illustrated. FIG. 11A indicates the change in the light signal received by a node 34 as a person walks through the area being monitored by the node 34. As shown in the graph, the movement of one or more persons through the area appears as one or more blocks or steps, each of which has an increased and constant magnitude relative to a baseline measurement. These steps indicate the temporary presence of a person and his or her proximity to the node 34. FIG. 11B, which represents the detection of smoke from a smoldering fire, appears graphically as a continuously changing signal having an accelerating increase in the change in light signal received by a node 34 over time. It should be understood that the graphs illustrated are examples only. Accordingly, each predefined event detectable by the detection system 20 has one or more unique parameters associated therewith such that the control unit 52 of the detection system 20 can distinguish between and identify multiple types of events.

To reduce the noise associated with each signal, the light emitting device 36 may be modulated such that the device 36 is selectively operated to generate modulated light in a specific pattern. In an embodiment, the light within the pattern may vary in intensity, duration, frequency, phase, and may comprise discrete pulses or may be continuous. The specific pattern of light may be designed to have desirable properties such as a specific autocorrelation with itself or cross-correlation with a second specific pattern. When the light is emitted in a specific pattern, the light scattered back to a corresponding light sensing device 38 should arrive in the substantially same pattern. Use of one or more specific and known patterns provides enhanced processing capabilities by allowing for the system 20 to reduce overall noise. This reduction in noise when combined with the signal processing may result a reduction of false positives and improved device sensitivity, e.g. with an improved signal to noise ratio the total number of false events or conditions detected will decrease, and the device sensitivity may be improved. Improvement of device sensitivity may further increase the functional limits of the detection system 20. By cross-correlating one or more second patterns, specific causes of transmitted or reflected signals may be distinguished, e.g. by Bayesian estimation of the respective cross-correlations of the received signal with the one or more second patterns.

In addition, modulation of the light signal emitted by the light source 36 may provide improved detection by determining more information about the event or condition causing the scatter in the light signal received by the node 34. For example, such modulation may allow the system 20 to more easily distinguish between a person walking through the designated area adjacent a node, as shown in FIG. 11A, and a smoldering fire adjacent the node 34.

Figure 12:
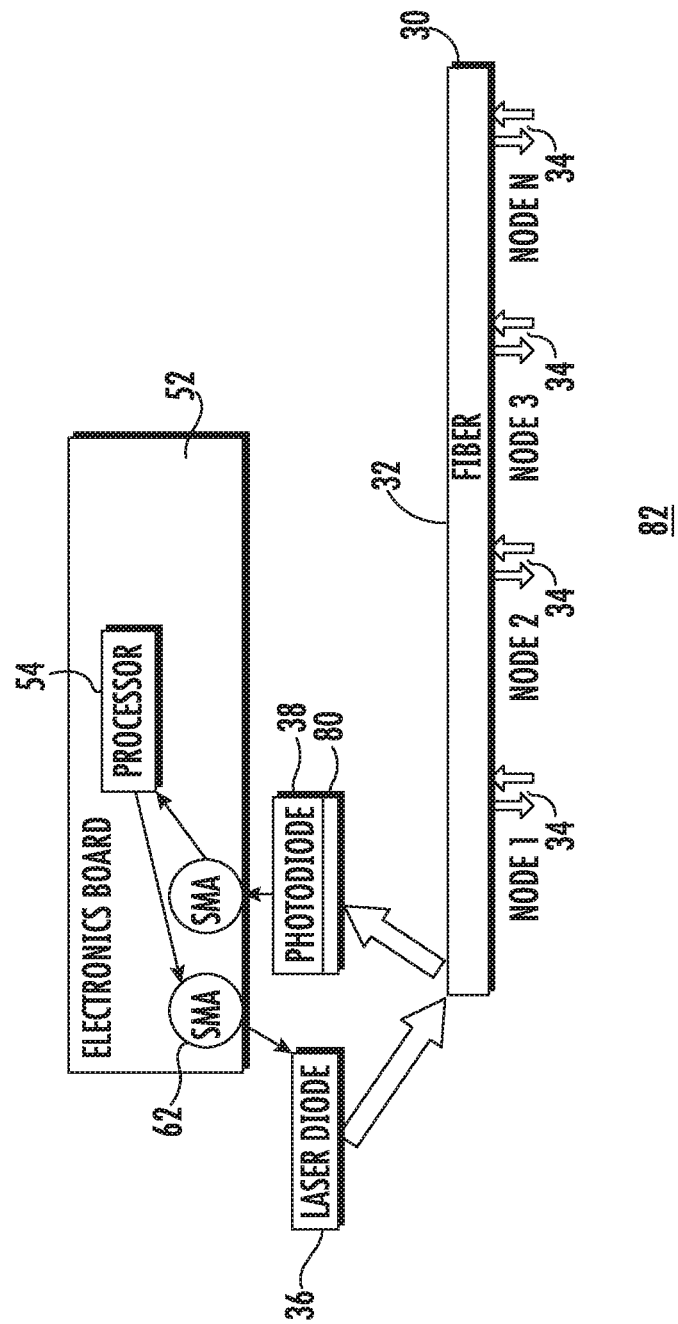
FIG. 12 is another schematic diagram of a detection system.

Referring now to FIG. 12, in some embodiments the system 20 includes one or more optical enhancement devices 80, such as a bandpass filter, a polarizer, an antireflective coating, a wave plate, and/or other optical features to reduce interference from non-event signals, or other non-desired signals, such as ambient light from either sunlight or lighting in the space, or from solid objects in the predetermined space 82. Further, the optical enhancement devices 80 may be utilized to reduce undesired wavelengths and/or intensities transmitted from the light source 36. The optical enhancement 80 is placed in the system 20 downstream of the light source 36, in some embodiments a laser diode, and upstream of the light sensitive device 38, in some embodiments the photodiode. The optical enhancement device 80 is placed so that light scattered and reflected back to the light sensitive device 38 is passed through the optical enhancement device 80 to filter or differentiate events or other conditions to be sensed from other signals due to, for example, ambient light, solid objects, bugs, dust, or water vapor.

With further reference to FIG. 12, in some embodiments the optical enhancement 80 is located at the light sensitive device 38 and/or is a component of, integral to or embedded within the light sensitive device 38. Further, the light sensitive device 38 may be configured such that the optical enhancement device 80 is readily removable and/or replaceable with another optical enhancement 80 to filter or disseminate different conditions in the scattered/reflected signal.

Figure 13:
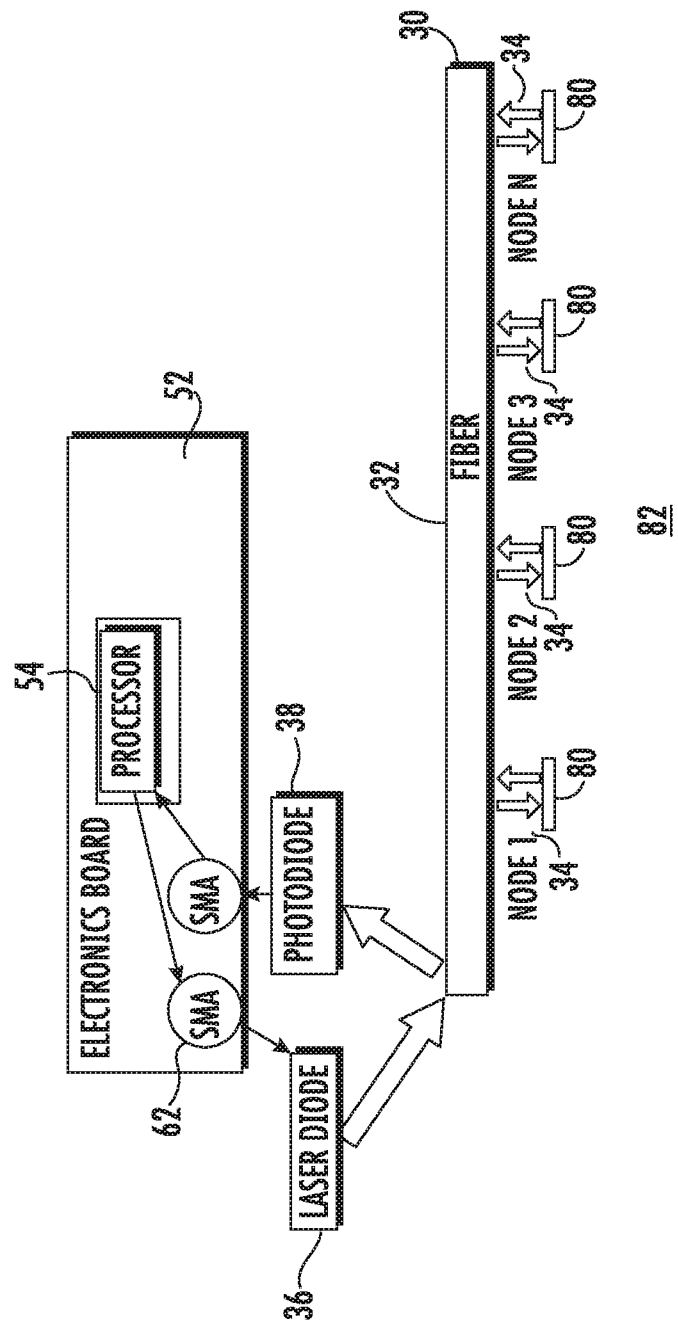
FIG. 13 is yet another schematic diagram of a detection system.

While in the embodiment of FIG. 12, the optical enhancement device 80 is located at the light sensitive device 38 or embedded in the light sensitive device 38, in other embodiments the optical enhancement device 80 is located at other locations, such as at the node 34 as shown in FIG. 13. This allows for node-specific placement of optical enhancement devices 80 such that different optical enhancement devices 80 may be placed at different nodes 34. Further, in some embodiments, combinations of optical enhancement devices 80, such as combinations of bandpass filters and polarizers, may be utilized to filter or disseminate certain conditions of the scattered/reflected light. Further, in systems 20 where the nodes 34 include two or more cores 40, 42, optical enhancements 80 may be located at an individual core 40, 42 or at two or more of the cores 40, 42.

Figure 14:
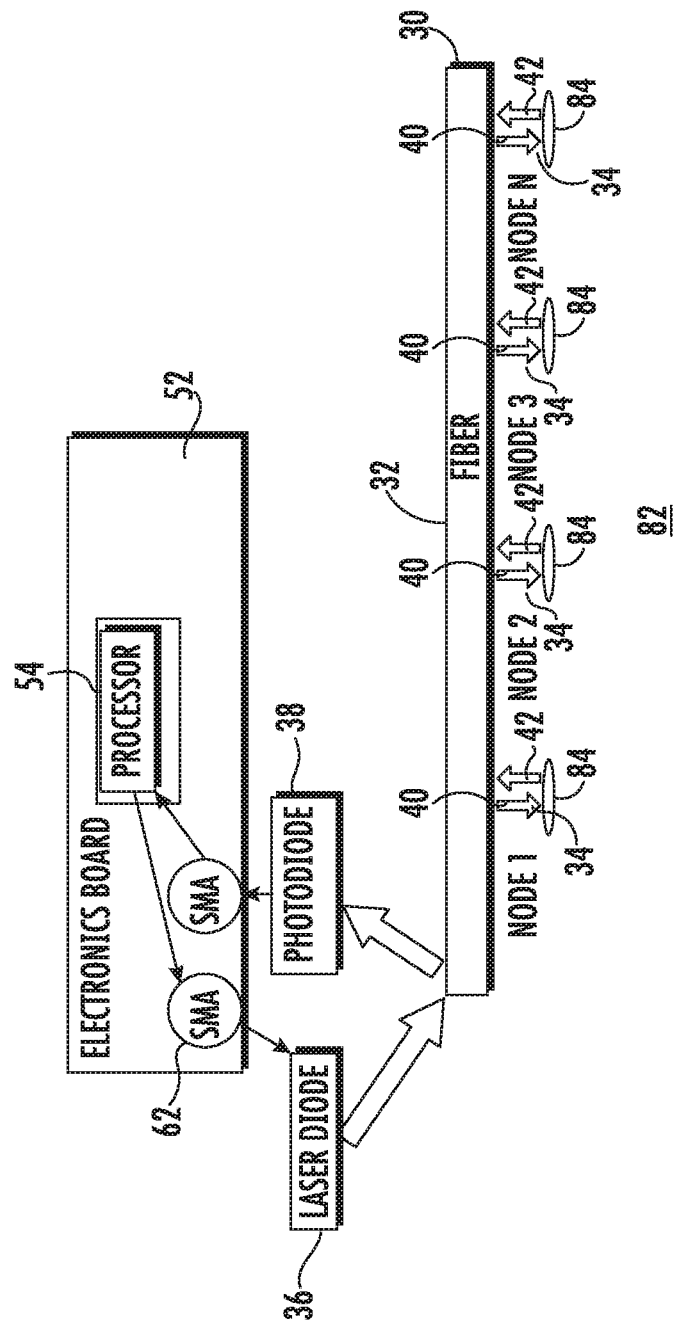
FIG. 14 is a schematic diagram of a detection system using lenses.

Referring now to FIG. 14, in some embodiments the system 20 includes focusing or expanding optical elements 84 to increase range, sensitivity or field of view of the detection system 20 in detecting smoke/gas or other conditions or events. A focusing optical element 84 can be placed at the node 34 or between the control system 50 and fiber harness 30 to increase range and sensitivity by converging or collimating light. Also, an expanding optical element 84 can be placed in similar locations to increase the field of view of the node by diverging the light. By way of example, optical elements may include mirrors, focusing lenses, diverging lenses, and diffusers, along with the integration of antireflective coatings on the optical elements or components thereof.

As shown in FIG. 14, the optical elements 84 may be one or more lenses located at the node 34. The lens 84 reduces divergence of the outgoing beam transmitted from the light source 36, while also increasing the amount of scattered light accepted by the node 34 for transmission to the light sensitive device 38. In some embodiments, the lens 84 is fused to the end of cores 40, 42 at the node 34 to reduce scattering of the light off of the lens 84 face, thereby enhancing light collection efficiency of the node 34. Further, in some embodiments, cores 40, 42 may have lensed and tapered fibers, which do not require fusing and function as a lens 84. Further, the lens 84 may include beam steering features, such as a solid state material which is utilized to change the refractive index of incident light to steer the light along the cores 40, 42. The beam steering feature may also be a photonic integrated circuit, which utilizes patterned silicon to control the directional emission of light.

Figure 15:
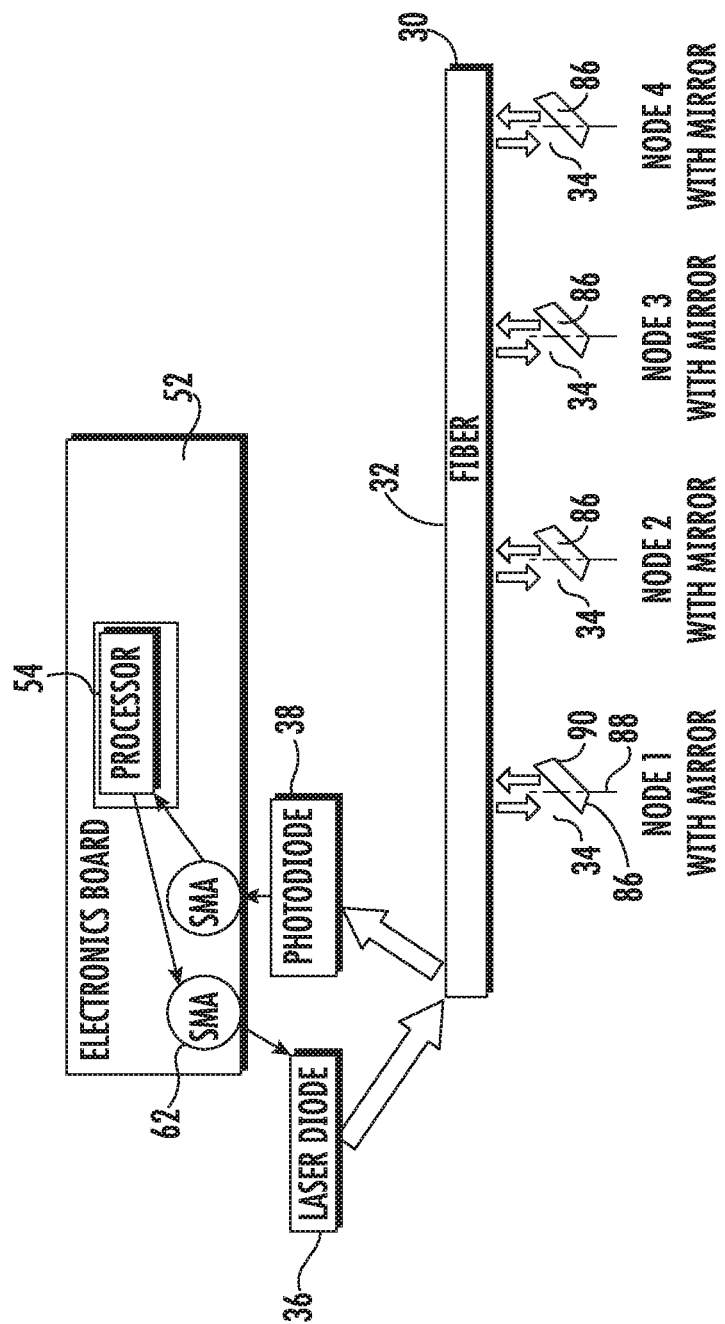
FIG. 15 is a another schematic diagram of a detection system using mirrors.

Referring now to FIG. 15, in some embodiments the optical elements may include a parabolic mirror 86 located at the node 34. The parabolic mirror 86 is located off-angle relative to a node axis 88. As with the lens 84, the parabolic mirror 86 reduces divergence of the outgoing beam transmitted from the light source 36, while also increasing an amount of scattered light accepted by the node 34 for transmission to the light sensitive device 38. In some embodiments, the parabolic mirror 86 is configured to rotate about a rotational axis during operation of the system 20 to further increase a coverage area of the node 34.

In some embodiments, both lens 84 and mirror 86 may be utilized at node 34. Further, while in the embodiments illustrated in FIGS. 14 and 15 optics are utilized at each node 34, in other embodiments, optics may be utilized only at selected nodes 34 to provide their benefits to the selected nodes 34, such as increasing detection range at selected nodes 34 due to, for example, constraints in placement of nodes 34 in the protected space. In other embodiments, the optical elements can be placed at the light source 36 or light sensitive device to enhance the detection system 50.

In addition to smoke or dust, the system 20 may be utilized to monitor or detect pollutants such as volatile organic compounds (VOC's), particle pollutants such as PM2.5 or PM10.0 particles, biological particles, and/or chemicals or gases such as $H_2$, $H_2S$, $CO_2$, $CO$, $NO_2$, $NO_3$, or the like. Multiple wavelengths may be transmitted by the light source 36 to enable simultaneous detection of smoke, as well as individual pollutant materials. For example, a first wavelength may be utilized for detection of smoke, while a second wavelength may be utilized for detection of VOC's. Additional wavelengths may be utilized for detection of additional pollutants, and using multiple wavelength information in aggregate may enhance sensitivity and provide discrimination of gas species from false or nuisance sources. In order to support multiple wavelengths, one or more lasers may be utilized to emit several wavelengths. Alternatively, the control system can provide selectively controlled emission of the light. Utilization of the system 20 for pollutant detection can lead to improved air quality in the predetermined space 82 as well as improved safety.

Figure 16:
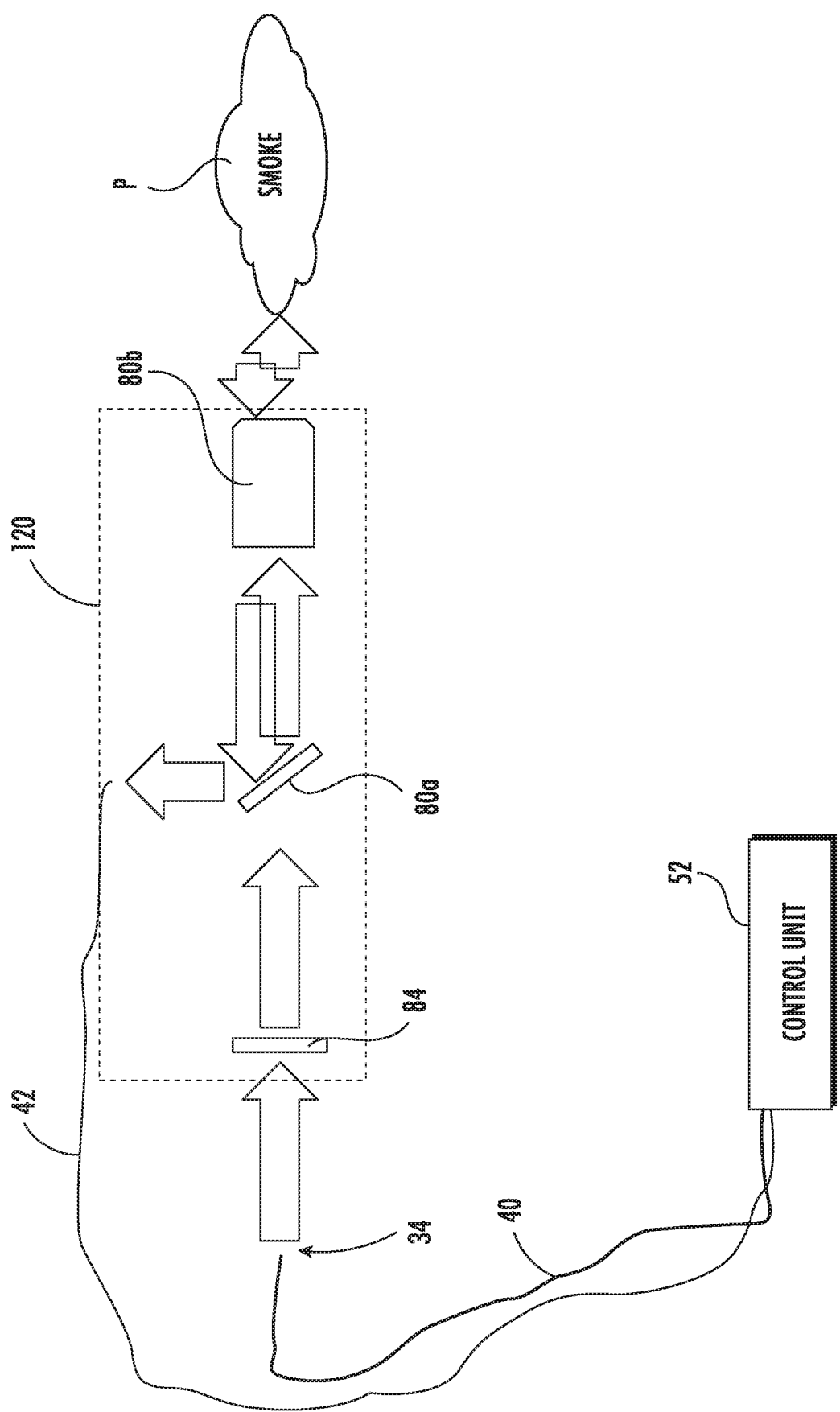
FIG. 16 is a schematic diagram of a detection system according to an embodiment.
Figure 17:
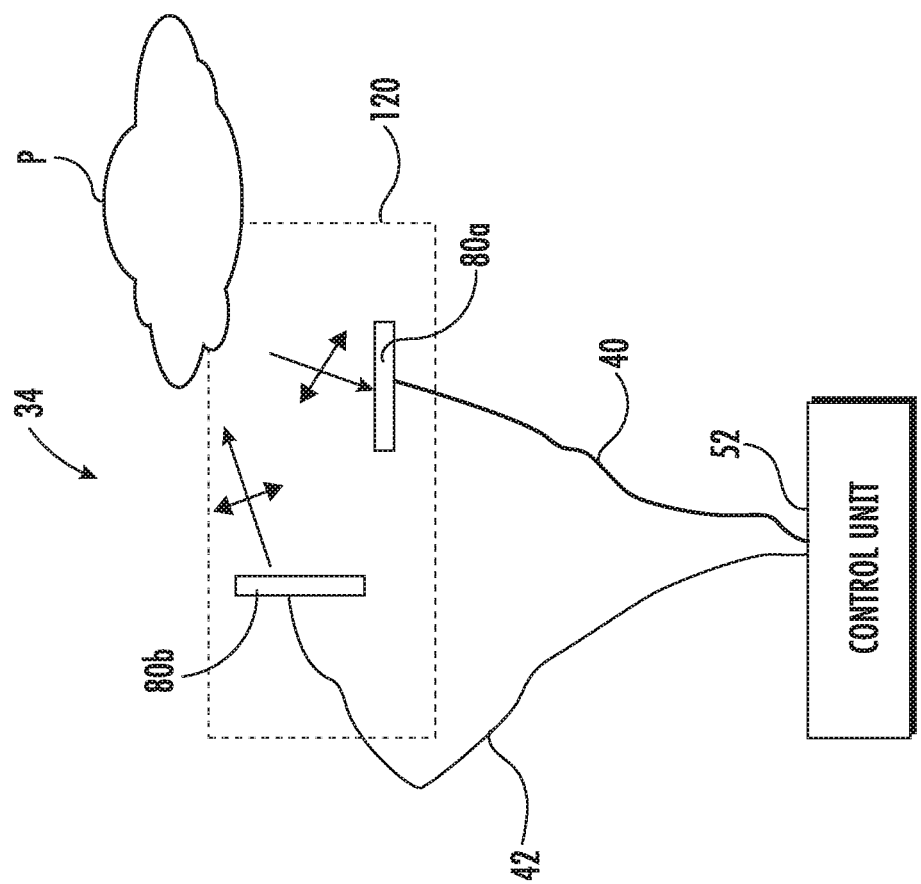
FIG. 17 is another schematic diagram of a detection system according to an embodiment.

In embodiments including one or more of an optical enhancement device 80 and/or a focusing or expanding optical element 84, the optical enhancement device 80 and/or optical element 84 may be used to evaluate the composition of the particles in the ambient atmosphere adjacent the node 34. With reference now to FIGS. 16 and 17, the emitted and reflected back to a node 34 of the system 20 is configured to pass through more than one optical enhancement device 80, more than one focusing or expanding optical element 84, or a combination thereof, to further enhance the system's ability to discriminate between a desired type of particle (i.e. smoke) and nuisance particles (i.e. dust). As shown in FIG. 16, a discrimination assembly 120 including at least one optical enhancement device 80 and at least one focusing optical element 84 is provided at the node 34. In the illustrated, non-limiting embodiment, the fiber optic cable 28 includes a first core 40 and a second core 42 such that a node 34 is defined at the free end of the cores 40, 42. The focusing optical element 84 of the discrimination assembly 120 may be a collimating lens 84 for example, operable to increase range and sensitivity by converging or collimating the light passing there through. Although the focusing optical element 84 is shown at the node 34 (i.e. adjacent the end of the core 40), in other embodiments, the focusing optical element 84 may be arranged at any position along the path of travel defined by the first core 40, including at the light source 36. The focusing optical element 84 is configured to narrow the beam of light emitted from the light source 36 by aligning the direction of motion of the light in a specific direction.

A first optical enhancement device 80a may be arranged in-line with and downstream from the focusing element 84 and a second optical enhancement device 80b is arranged in-line with downstream from the first optical enhancement device 80a relative to the emission of light from the first core 40. Although the first optical enhancement device 80a is illustrated as being positioned between the focusing element 84 and the second optical enhancement device 80b, in other embodiments, the first optical enhancement device 80a may be arranged at any location.

In the illustrated, non-limiting embodiment, the first optical enhancement device 80a is configured to separate the received light, but not the light transmitted from the node 34, based on wavelength. Examples of the first optical enhancement device 80a includes a bandpass filter and a dichroic mirror. The second optical enhancement device 80b receives the transmitted light focused by the focusing element 84, and unaffected by the first optical enhancement device 80a, and orients light to a focal point. The convergence of the light to a focal point increases the light intensity in a small volume. In an embodiment, the second optical enhancement device 80b is a microscope objective. However, it should be understood that other combinations of optical enhancement devices 80 are also within the scope of the disclosure.

In an embodiment, the focusing optical element 84 and the plurality of optical enhancement devices 80a, 80b of the discrimination assembly 120 cooperate to perform Raman scattering, frequency shifting, or two-photon excitation. As the light emitted by the light source 36 passes through the focusing element 84, the light rays are oriented generally parallel to one another. These parallel light rays then pass unaltered through the first optical enhancement device 80a in a first direction, to the second optical enhancement device 80b where the parallel light rays are focused. From the second optical enhancement device 80b, the focused light is provided to the ambient atmosphere.

Figure 18:
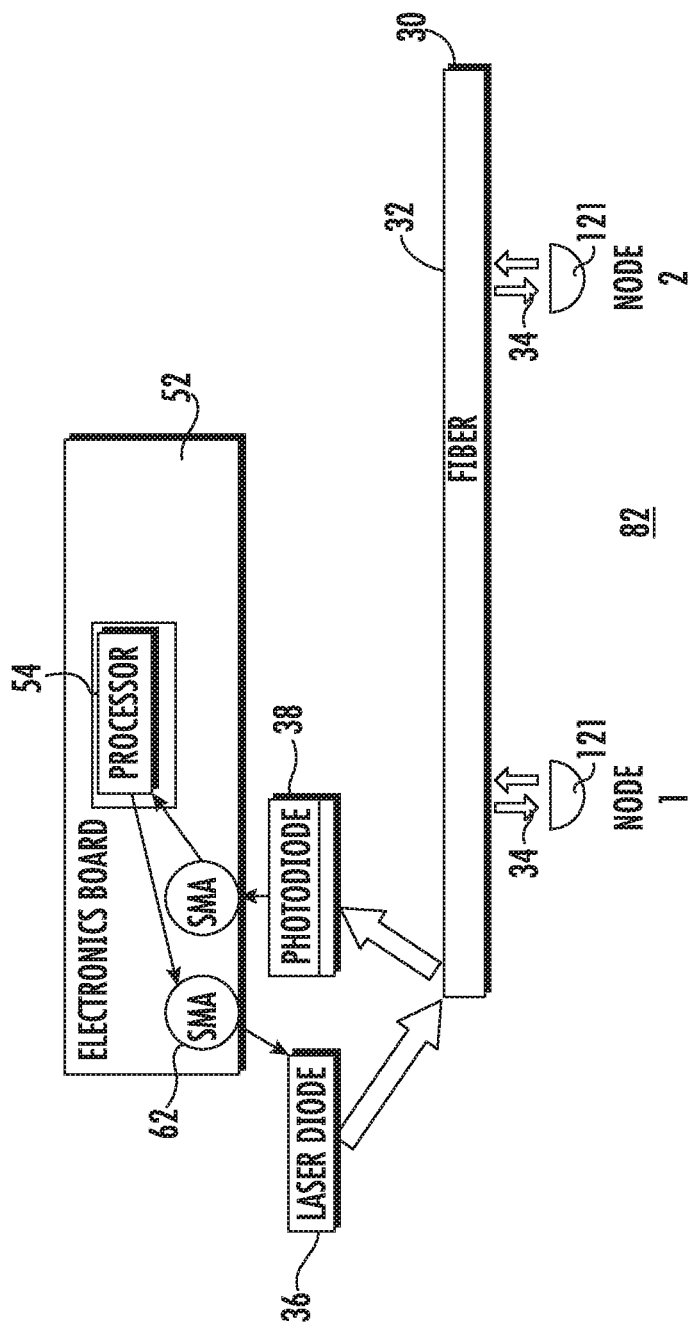
FIG. 18 is yet another schematic diagram of a detection system according to an embodiment.

Alternatively, in some embodiments, best shown in FIG. 18, a cover plate 121 is positioned adjacent to and surrounding the node 34 such that the light is transmitted from the node 34 into the chamber or cavity defined by the cover plate 121. In such embodiments, the focused light output from focusing element 84 is also arranged within the interior of the cavity defined by the cover plate 121. Accordingly, all or at least a portion of the discrimination assembly 120 may be located within the cover plate 121. Further, the focusing of the light that occurs may occur within the cavity defined by the cover plate 121, or alternatively, at a surface of the cover plate 121. In embodiments where the focusing occurs at the surface, the surface of the cover plate 121 may include a coating, such as gold or a structured dielectric for example. As the light is focused, the light interacts with the surface to enhance the electric field intensity, which increases any scattering of the light that occurs.

With continued reference to FIG. 16, if one or more particles P are present adjacent the node 34, the interaction between the light and the particles P will cause the photons of the light to scatter. Although most of the photons will elastically scatter, a small fraction of the photons will scatter inelastically as a result of a photon-photon interaction. During this two-photon excitation, the photons of the low frequency-focused light output from the second optical enhancement device 80b will interact with the particles P adjacent the node 34, causing an excitation of one or more electrons. As the excited electrons return to a ground state, one or more high frequency photons are emitted. In an embodiment, the emitted photons have a higher frequency that would normally not be achievable in other particulates. This resulting higher frequency light to be reflected back to the node 34 is collected by the second optical enhancement device 80b and is separated into one or more wavelengths at the first optical enhancement device 80a. As a result of this separation, only a portion of the separated higher frequency light is provided to the second core 42 at the node 34 for transmission to a light sensing device 38 and analysis by the control unit 52.

An example of a Raman Antistokes Table that could be used to evaluate the light transmitted through and received by the discrimination assembly is shown below:

| Classification | Compound | Incident wavelength (nm) | Shift Wavenumber (nm) - Antistokes | Power (mW/cm^2) |
| --- | --- | --- | --- | --- |
| Toxic industrial Gas | Hydrogen Sulfide (H2S) | 636 | 545 | 10-1000 |
| Background | Nitrogen N2 | 636 | 553 | 10-1000 |
| Background | Oxygen O2 | 636 | 578 | 10-1000 |
| Background | Carbon Dioxide | 636 | 588 | 10-1000 |

Additional classifications and compounds are also contemplated herein which may be evaluated by inclusion in a Raman Antistokes Table.

Using the frequency shift between the lower frequency light emitted at the node 34 and the higher frequency light received at the node 34, Raman spectroscopy can be applied to the light received at the light sensing device 38 to provide a structural fingerprint by which the particles present adjacent the node may be identified. Accordingly, the phase shift between the light emitted and the light received depends upon the material of the particles interacting with the light in transit, thereby enabling identification of smoke particles even in the presence of nuisance sources. Through this detection of frequency changes using the discrimination assembly 120 and analysis of Raman scattering by control unit 52, the system 20 is able to discriminate between smoke particles and nuisance particles at low obscuration values and independent of particle size.

With reference now to FIG. 17, in another embodiment, the discrimination assembly 120 may be adapted to use polarization to identify particles having crystalline structures, and therefore discriminate between smoke and other nuisance particles. In such instances, the polarization of the light emitted by the light source 36 is different than the polarization of the light received at the light sensing device 38. Such principles may be applied to a single node 34, or alternatively, to a plurality of nodes 34 of the system 20 to discriminate against different types of nuisance particles at different locations.

In the illustrated, non-limiting embodiment, the at least one optical enhancement device 80 of the discrimination assembly 120 is utilized to reduce undesired wavelengths and/or intensities transmitted from the light source 36. As shown, the fiber optic cable 28 includes a first core 40 and a second core 42, the free ends of which are arranged at a node 34. The system 20 includes a first optical enhancement device 80a positioned along the path of travel of defined by the first core 40 and a second optical enhancement device 80b positioned along the path of travel defined by the second core 42. As shown, both the first enhancement device 80a and the second enhancement device 80b are located adjacent the ends of the cores 40, 42, at the node 34. By positioning the second optical enhancement device 80b at the node 34, different optical enhancement devices 80 may be placed at different nodes 34. However, these devices may be arranged at any location relative to the path of the light emitted and the light received, such as at the light sensitive device 38 and/or a component of, integral to or embedded within the light sensitive device 38. Alternatively, one or more of the optical enhancement devices 80a, 80b may be embedded as polarizing fibers in the first core 40 and the second core 42, respectively. Further, the light sensitive device 38 may be configured such that the optical enhancement device 80b is readily removable and/or replaceable with another optical enhancement device to filter or disseminate different conditions in the scattered/reflected signal. The combination of optical enhancement devices may be utilized to filter or disseminate certain conditions of the scattered/reflected light.

In an embodiment, the first optical enhancement device 80a and the second optical enhancement device 80b may have the same orientation, such that light waves having the same polarization will be allowed through both the first and second optical enhancement device 80a, 80b. Use of optical enhancement devices 80a, 80b having the same orientation provides additional filtering of the light within the ambient atmosphere and provides discrimination of crystalline materials from amorphous materials. However, in other embodiments, the first and second optical enhancement devices 80a, 80b may have different orientations. By varying the orientations of the first and second optical enhancement devices 80a, 80b, the devices 80a, 80b may cooperate to control one or more parameters of the filtered light, including but not limited to the material crystallinity, composition, polarizability (smoke and water vapor) and the ability to determine the reorientation of the light via a probing laser.

Figure 19:
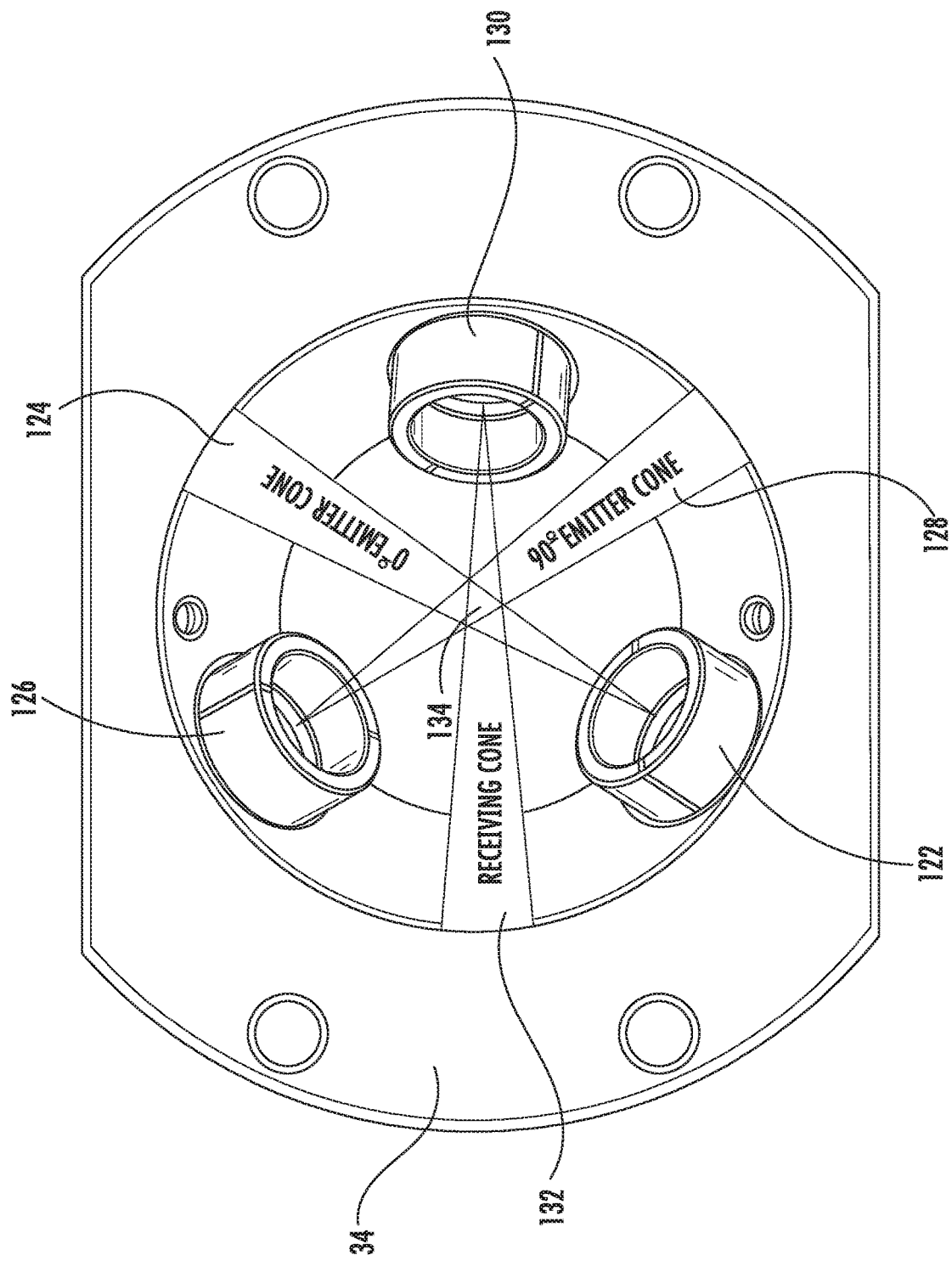
FIG. 19 is a plan view of a node of a detection system according to an embodiment.
Figure 20:
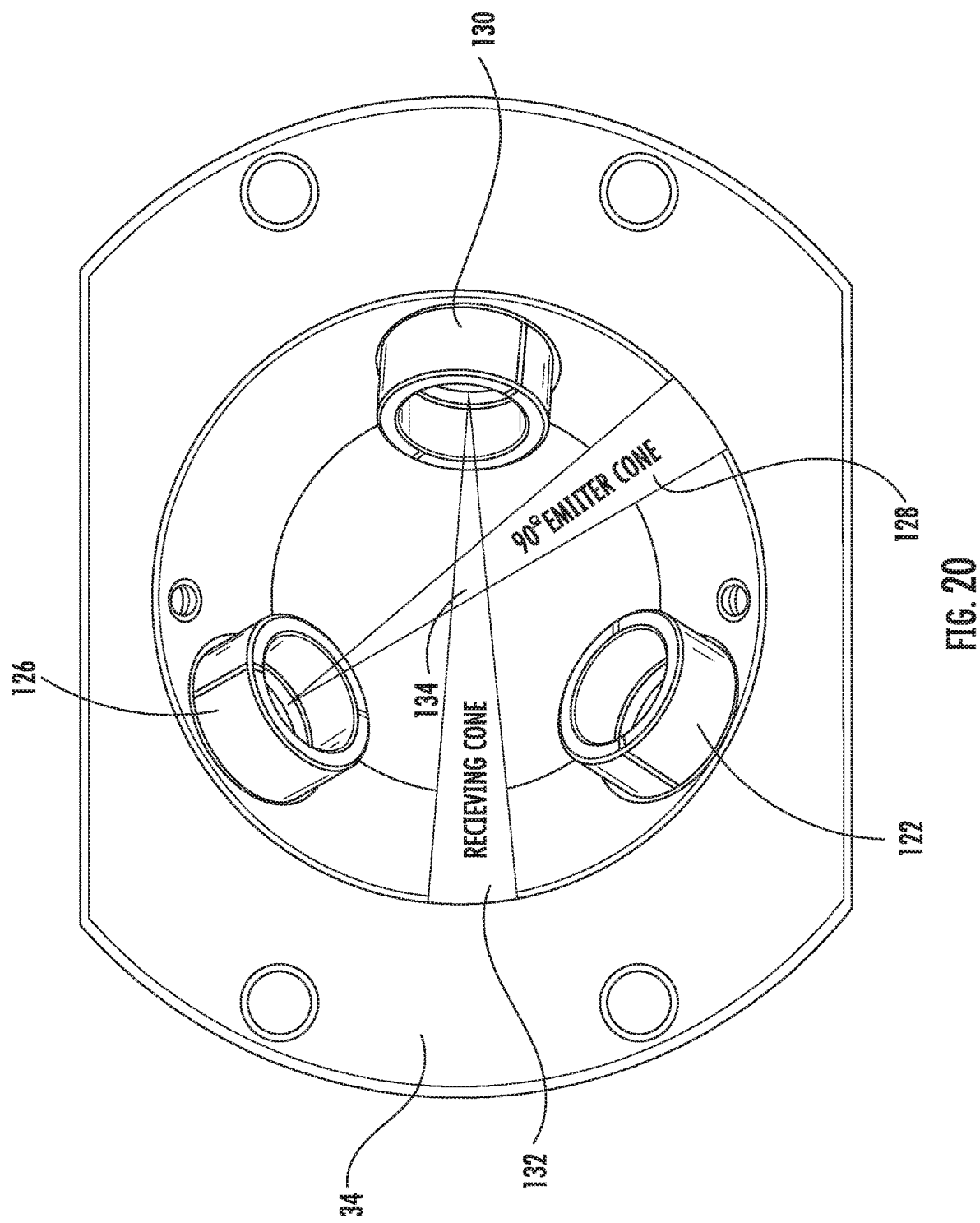
FIG. 20 is a plan view of the node of FIG. 19 with only one emitter cone illustrated according to an embodiment.
Figure 21:
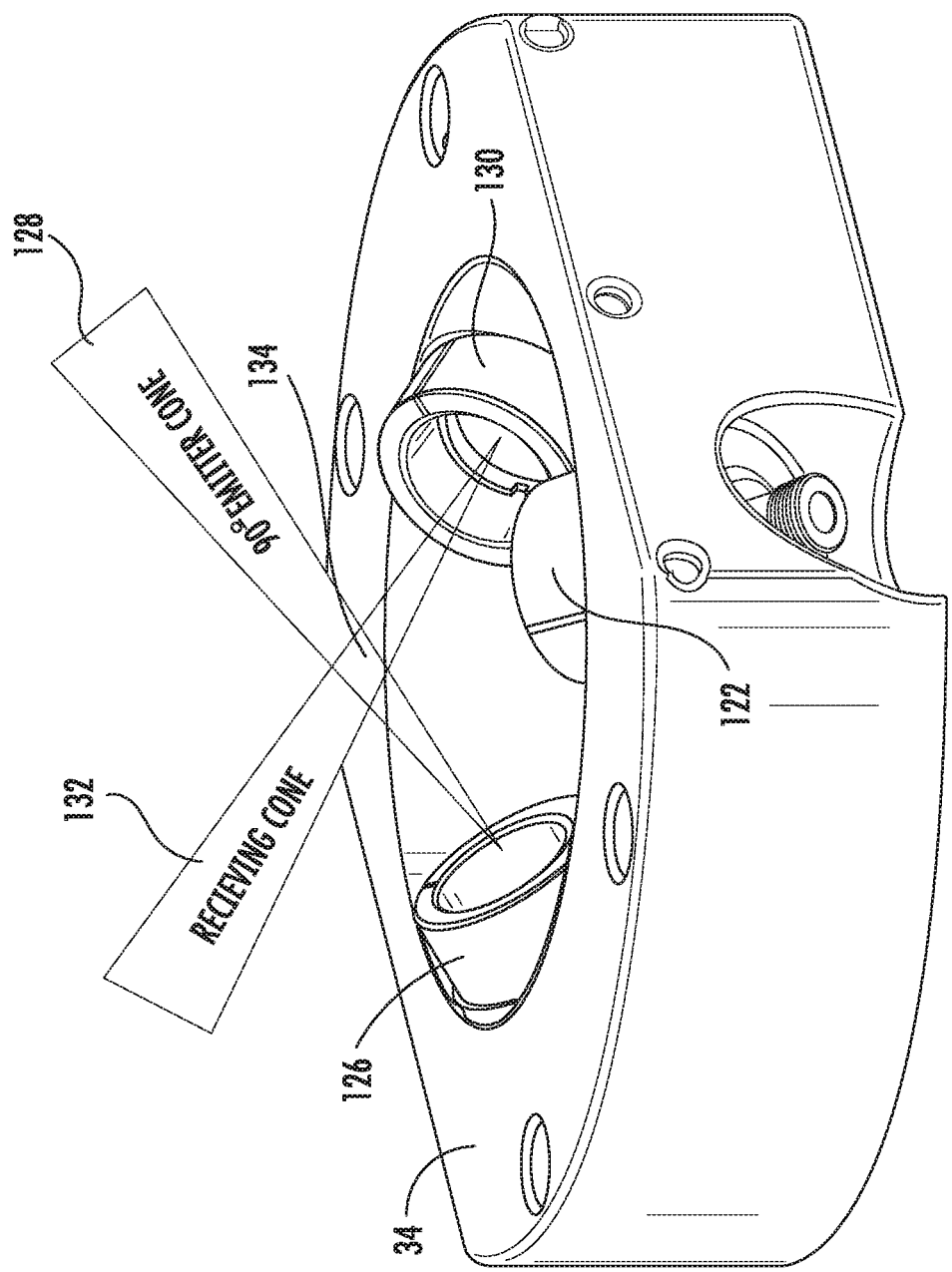
FIG. 21 is a side view of the node of FIG. 20 according to an embodiment.

With reference to FIGS. 19-21, various views of a detection node 34 are illustrated. As shown, the node 34 includes a plurality of openings associated with an end of each core at the node 34. For example, the node 34 includes a first opening 122 associated with a first core (not shown), and through which light from a light source 36 is emitted. As shown, the emitted light defines an emitting cone 124. The emitting cone 124 increases in diameter away from the opening 122. In the illustrated, non-limiting embodiment, the node 34 includes a second opening 126 associated with a second core (not shown), and through which an emitting cone 128 of light from a light source 36 is emitted. In the illustrated, non-limiting embodiment, the first emitter cone 124 is oriented at zero degrees and the second emitter cone 128 is oriented at a position of 90 degrees relative to the first emitter cone 124 and the node 34. The light source 36 associated with the second core may be the same or different as the light source associated with the first core. Similarly, a third opening 130 of the node 34 corresponds to third core (not shown), and a light sensitive device 38, and has a receiving cone 132 associated therewith. The volume where each emitting cone 124, 128 overlaps with the receiving cone 132 is defined as a sensing volume 134. These sensing volumes 134 established at each node 34 may be used for polarization measurements.

The angle between the first and second optical enhancement devices 80a, 80b is critical to the discrimination performed by the detection system 20. In FIG. 19 the radial angle between the centerline of the emitter cone 128 and the center line of the receiving cone 132 are drawn to be 120°. In FIG. 21, the repose angle of the centerline of the emitter cone 128 and the receiving cone 132 are 34° from the surface of the node 134. The repose angle and radial angle may be customized to detect light scattering in a substantially orthogonal configuration between the emitter cone 128 and the receiving cone 132. A back scattering configuration can be achieved by reducing the radial angle or increasing the repose angle from the orthogonal configuration. A forward scattering configuration is achieved by reducing the repose angle or increasing the radial angle. A node 34 could potentially contain a combination of forward scattering, backward scattering and/or orthoganol configurations. Further, the sensitivity of the detection system 20 at each node 34 may vary based on the distance between the second optical enhancement device 80b and/or the light sensing device 38 relative to the center where the scattering of the emitted light occurs. In addition, inclusion of multiple optical enhancement devices 80 may further enhance or fine tune the discrimination being performed.

Referring again to FIG. 17, in operation, light is emitted from the light source 36 into the first core 40. The light emitted can be selected from the wavelength range of 350-1000 nm based on light sources. Within the first core 40, the light passes through the first optical enhancement device 80a, where the light is reoriented (i.e. polarized) based on the configuration of the device 80a. The polarized light is then emitted from the node 34 into the adjacent ambient atmosphere, or the cavity defined by the cover plate 121. If one or more particles P are present adjacent the node 34, the polarized light will most probably interact with the particles P. This interaction may cause the electric field or polarization of the light to rotate. In addition, the interaction of the light with the one or more particles P causes a portion of the rotated light to reflect back to the node 34. This scattered, rotated light is received by the second core 42, where it is transmitted toward the light sensing device 38. Prior to reaching the light sensing device 38, the light is provided to the second optical enhancement device 80b. The second optical enhancement devices 80b acts as a filtering device such that only the portion of the rotated light that is aligned with the orientation of the second optical enhancement device 80b will be allowed to pass through the device 80b to the second core 42 and the light sensing device 38. As a result, only the light that interacted with the particles may be provided to the light sensing device 38. From the light sensing device 38, the received light is analyzed by the control unit 52 to determine an intensity and presence of a particular type of particle P, such as smoke for example. Accordingly, the first and second optical enhancement devices 80a, 80b cooperate to filter or differentiate events or other conditions of concern targeted to be sensed from other untargeted signals caused by conditions not of specific interest, for example, ambient light, solid objects, bugs, dust, or water vapor.

By evaluating the polarization of the reflected scattered light, a single detector or node 34 may be used to discriminate between smoke and nuisances. In one example, the intensity of light collected at a detector from one orientation is compared to the intensity of light collected at the detector from the second orientation. The magnitude of the signals and their ratio of the light intensity are used as features within the processing of the signals as shown in FIG. 10. Further, by controlling the orientation of the light received, the polarization dependence of the reflected scattered light reduces the complexity of the detector and also the geometric alignment of the detector and the light source, thereby enabling simple geometries to be employed. In addition, one or more optical enhancement devices 80 may be used to separate the scattered light into multiple wavelengths, and one or more of the plurality of wavelengths may be evaluated to determine information about the size and composition of the particles present adjacent the node 34. This information may be used to update the processing algorithm to provide enhanced discriminate between various types of particles present adjacent a node 34.

While the disclosure has been described in detail in connection with only a limited number of embodiments, it should be readily understood that the disclosure is not limited to such disclosed embodiments. Rather, the invention can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A detection system for measuring one or more conditions within a predetermined area comprising:
    a fiber optic cable including a first core for transmitting light to an ambient atmosphere adjacent a node and a second core for receiving scattered light from the ambient atmosphere adjacent the node;
    a discrimination assembly operably coupled to the first core and the second core, the discrimination assembly including at least one focusing element and at least one optical enhancement device, wherein the at least one optical enhancement device separates the scattered light received from the ambient atmosphere into a plurality of wavelengths such that only a portion of the scattered light received at the discrimination assembly is provided to the second core; and
    a control system operably coupled to the fiber optic cable so that the scattered light received from the ambient atmosphere is transmitted to the control system, wherein the scattered light received by from the ambient atmosphere has a higher frequency than the light transmitted to the ambient atmosphere and only the scattered light received from the ambient atmosphere having a desired wavelength is transmitted to the control system.

2. The detection system of claim 1, wherein the at least one focusing element and at least one optical enhancement device of the discrimination assembly cooperate to perform Raman scattering.

3. The detection system of claim 1, wherein the at least one optical enhancement device is arranged downstream from an in-line with the at least one focusing element.

4. The detection system of claim 1, further comprising a cover plate having an internal cavity, the cover plate surrounding the node and the discrimination assembly such that the node is in communication with the internal cavity.

5. The detection system of claim 1, wherein the focusing element orients light rays of the transmitted light to a focal point.

6. The detection system of claim 1, wherein the focusing element includes a collimating lens.

7. The detection system of claim 1, wherein the at least one optical enhancement device includes a first optical enhancement device and a second optical enhancement device.

8. The detection system of claim 7, wherein the first optical enhancement device includes a bandpass filter.

9. The detection system of claim 7, wherein the first optical enhancement device separates the scattered light received at the first optical enhancement device into a plurality of wavelengths.

10. The detection system of claim 7, wherein the second optical enhancement device includes a microscope objective.

11. The detection system of claim 1, wherein the scattered light received by the node is analyzed to determine whether a condition is present at the node.

12. The detection system of claim 10, wherein the condition is smoke.

13. The detection system of claim 1, wherein the scattered light is received from a sensing volume arranged at an intersection between an emitted light cone and a receiving light cone.

14. A method of evaluating an area for a condition comprising:
    transmitting light from a first core of a fiber optic cable at a node;
    focusing the transmitted light via a discrimination assembly;
    transmitting the focused light into the area;
    scattering the focused light;
    separating the scattered light into a plurality of wavelengths via the discrimination assembly, wherein only a portion of the scattered light received at the discrimination assembly is provided to the second core of the node;
    communicating the scattered light having a desired wavelength received at a second core of the node to a control system; and
    analyzing the scattered light to evaluate the condition within the area.

15. The method of claim 14, wherein transmitting light from a first node of a fiber optic cable includes transmitting light from the first node into an internal cavity defined by a cover plate surrounding the node.

16. The method of claim 14, wherein focusing the transmitted light further comprises passing the transmitted light through at least one of a focusing element and an optical enhancement device of the discrimination assembly.

17. The method of claim 14, wherein transmitting the focused light into the area causes an interaction between the focused light and at least one particle, the interaction resulting in emission of at least one high frequency photon.

18. The method of claim 14, wherein a frequency of the scattered light is higher than a frequency of the focused light.

19. The method of claim 14, wherein separating the scattered light a plurality of wavelengths via the discrimination assembly further comprises passing the transmitted light through at least one of a focusing element and an optical enhancement device of the discrimination assembly.

20. The method of claim 14, wherein the portion of light arranged at intersection between an emitted light cone and a receiving light cone is provided to the second core of the node.

21. The method of claim 14, wherein analyzing the scattered light is used to evaluate a presence of smoke within the area.

* * * * *